(12) United States Patent
Cosentino et al.

(10) Patent No.: US 12,466,745 B2
(45) Date of Patent: Nov. 11, 2025

(54) ELECTROLYTIC BIOCIDE-GENERATING UNIT INTEGRATED WITH STRAINER

(71) Applicant: ElectroSea, LLC, Wayzata, MN (US)

(72) Inventors: Louis Ciro Cosentino, Palm Beach Gardens, FL (US); Daniel L. Cosentino, Wayzata, MN (US); Brian Alan Golden, Eden Prairie, MN (US); Peter Samuel Broen Finzell, Shoreview, MN (US)

(73) Assignee: ElectroSea, LLC, Plymouth, MN (US)

( * ) Notice: Subject to any disclaimer, the term of this patent is extended or adjusted under 35 U.S.C. 154(b) by 606 days.

(21) Appl. No.: 17/816,230

(22) Filed: Jul. 29, 2022

(65) Prior Publication Data

US 2023/0031923 A1 Feb. 2, 2023

Related U.S. Application Data

(60) Provisional application No. 63/308,262, filed on Feb. 9, 2022, provisional application No. 63/281,469, filed (Continued)

(51) Int. Cl.
  *C02F 1/461* (2023.01)
  *B01D 35/28* (2006.01)
  (Continued)

(52) U.S. Cl.
  CPC .......... *C02F 1/46104* (2013.01); *B01D 35/28* (2013.01); *C02F 1/467* (2013.01);
  (Continued)

(58) Field of Classification Search
  CPC ...... C02F 1/467; C02F 1/4672; C02F 1/4674; C02F 2201/001; C02F 2201/008;
  (Continued)

(56) References Cited

U.S. PATENT DOCUMENTS 4,256,552 A 3/1981 Sweeney
4,714,534 A * 12/1987 Fair ...................... C02F 1/4674
                                                    204/278

(Continued)

FOREIGN PATENT DOCUMENTS

CA         1197489 A      12/1985
CN      107986402 A1 *    5/2018  ............ C02F 1/4672

(Continued)

OTHER PUBLICATIONS

PCT International Search Report and Written Opinion in International Application PCT/US2022/038888, mailed Feb. 27, 2023, 24 pages.

(Continued)

*Primary Examiner* — Luan V Van
*Assistant Examiner* — Alexander R. Parent
(74) *Attorney, Agent, or Firm* — Merchant & Gould P.C.

(57) ABSTRACT

A biocide-generating device including a housing having an inlet and an outlet. The biocide-generating device additionally including a strainer basket that mounts within an interior of the housing including parallel electrode plates positioned within an interior of the strainer basket. The biocide generating device additionally including a protective dielectric sleeve in which the electrode plates are received. The protective dielectric sleeve is positioned between the electrode plates and the strainer basket.

20 Claims, 23 Drawing Sheets

Related U.S. Application Data on Nov. 19, 2021, provisional application No. 63/227,485, filed on Jul. 30, 2021.

(51) Int. Cl.
    *C02F 1/467*     (2023.01)
    *C02F 103/02*     (2006.01)

(52) U.S. Cl.
    CPC ............. *B01D 2201/4053* (2013.01); *C02F 2001/46157* (2013.01); *C02F 1/4674* (2013.01); *C02F 2103/023* (2013.01); *C02F 2201/001* (2013.01); *C02F 2201/008* (2013.01); *C02F 2201/4611* (2013.01); *C02F 2303/20* (2013.01); *C02F 2303/24* (2013.01)

(58) Field of Classification Search
    CPC .......... C02F 2201/4611; C02F 2303/20; C02F 2303/24; C02F 2001/46157
    See application file for complete search history.

(56) References Cited

U.S. PATENT DOCUMENTS

| | | |
|---|---|---|
| 11,027,991 B2 | 6/2021 | Cosentino et al. |
| 11,053,140 B2 * | 7/2021 | Benzerrouk .......... C02F 1/4608 |
| 11,498,855 B2 | 11/2022 | Cosentino et al. |
| 2006/0097878 A1 | 5/2006 | Von Broembsen |
| 2016/0340213 A1 * | 11/2016 | Yamamoto ............ C02F 1/4674 |
| 2019/0106339 A1 * | 4/2019 | Cosentino ........... C02F 1/46104 |
| 2019/0368059 A1 * | 12/2019 | Veening .................... C25B 9/15 |
| 2020/0255306 A1 | 8/2020 | Cosentino et al. |
| 2020/0377387 A1 * | 12/2020 | Varanko .............. C02F 1/46104 |
| 2021/0123149 A1 * | 4/2021 | Sung .................... C02F 1/4674 |
| 2022/0112105 A1 | 4/2022 | Cosentino et al. |
| 2022/0119287 A1 | 4/2022 | Cosentino et al. |
| 2022/0212770 A1 | 7/2022 | Cosentino et al. |

FOREIGN PATENT DOCUMENTS

| | | |
|---|---|---|
| EP | 2977355 A1 | 1/2016 |
| KR | 100 928 069 B1 | 11/2009 |

OTHER PUBLICATIONS

PCT Invitation to Pay Fees in International Application PCT/US2022/038888, mailed Nov. 15, 2022, 16 pages.

"Electrolytic Chlorine Generation Brief History", submitted with 3rd Party Observation on Jul. 11, 2023 in corresponding Application PCT/US2022/038888, 1 page.

PCT Third Party Observation filed on Jul. 11, 2023 in corresponding Application PCT/US2022/038888, 2 pages.

* cited by examiner

ELECTROLYTIC BIOCIDE-GENERATING UNIT INTEGRATED WITH STRAINER

CROSS-REFERENCE TO RELATED APPLICATIONS

This application claims priority to and the benefit of U.S. Provisional Patent Application No. 63/308,262, filed Feb. 9, 2022, U.S. Provisional Patent Application No. 63/281,469, filed Nov. 19, 2021, and U.S. Provisional Patent Application No. 63/227,485, filed Jul. 30, 2021, the disclosures of which are incorporated herein by reference.

TECHNICAL FIELD

The present disclosure relates generally to biocide-generating devices for reducing or eliminating biofouling within water systems.

BACKGROUND

Biofouling caused by bio-growth (e.g., salt water or fresh water marine growth) can result in the clogging of water systems, and the inefficient operation, overheating, and malfunction of equipment dependent upon the water systems thereby leading to costly downtime and expensive repair. For some applications, the issue of bio-growth within water systems is addressed by periodic (e.g., semi-annual) acid cleaning of the water systems. Acid cleaning is expensive, time consuming, and involves the use of harsh and hazardous chemicals. Systems have also been developed to treat water systems in real-time to prevent bio-fouling through the in-situ generation of biocide within the water passing through the water systems (e.g., see U.S. Pat. No. 11,027, 991)

SUMMARY

One aspect of the present disclosure relates to a biocide-generating system for inhibiting biofouling within a water system. In one non-limiting example, the system can be a water system of a watercraft such that related equipment (e.g., a heat exchanger) of the watercraft can be operated at peak performance with minimal to no downtime. In certain examples, the biocide-generating system can include an electrolytic arrangement for providing the in-situ generation of biocide within the water passing through the water system. Biocide-generating systems in accordance with the principles of the present disclosure can be used for both salt water (e.g., sea and brackish water) as well as freshwater applications.

Aspects of the present disclosure relate to electrolytic biocide-generating devices and systems having electrolytic cells having features that facilitate effective operation when integrated with a strainer such as a marine strainer used for watercraft. In one example, the biocide generating devices have features that prevent debris from interfering with operation of electrodes of the electrolytic cells. In one example, the biocide generating devices have features that provide distributed water flow across electrode plates of the electrolytic cells while concurrently providing sufficient internal space within the strainer for debris captured by the strainer to be collected without interfering with the distributed water flow across the electrode plates. In one example, the electrode plates are positioned within a protective dielectric sleeve that prevents debris from becoming lodged between the electrode plates and assists in distributing flow across the electrode plates. In one example, the strainer is a strainer basket in which the electrode plates are positioned and in which the debris is collected, and the sleeve has openings that are larger than corresponding straining openings of the strainer basket. In one example, the electrode plates are arranged in a side-by side parallel arrangement and are positioned with upstream ends facing an inlet of a housing of the electrolytic cell, and with downstream ends facing an outlet of the housing of the electrolytic cell. In one example, the upstream ends are positioned along a reference plane that is oriented at an oblique angle relative to an inlet axis of the inlet and that is angled to extend in a downstream direction as the plane extends downwardly. In one example, the protective sleeve has an upstream face that extends along the reference plane. In one example, at least some of the electrode plates have a cross-flow opening defined therein to allow flow through the plate. In one example, a diverter that at least partially curves in an upstream direction is disposed between the electrode plates.

In another aspect, the present disclosure relates to a biocide-generating device. The biocide-generating device includes a housing having an inlet and an outlet and a strainer basket that mounts within an interior of the housing. The biocide generating device additionally includes parallel electrode plates positioned within an interior of the strainer basket and a protective dielectric sleeve in which the electrode plates are received, the protective dielectric sleeve being positioned between the electrode plates and the strainer basket, the protective sleeve defining holes larger than straining holes defined by the strainer basket.

In another aspect, the technology relates to a biocide-generating device including: a housing having an inlet and an outlet, the housing defining an interior; a strainer basket that removably mounts within the interior of the housing, the basket defining an inlet opening; a plurality of electrodes positioned at least partially within the strainer basket, each of the plurality of electrodes separated from one another by an interstitial space, each of the plurality of electrodes having an upstream portion facing the inlet, a downstream portion facing the outlet, a first end, and a second end; and one or more flow diverters disposed within the interstitial space between two of the plurality of electrodes, the one or more flow diverters positioned between the upstream and downstream portions and substantially elongated in a direction between the first end and the second end, wherein the one or more flow diverters have a length that is more than a quarter of a length of the plurality of electrodes between the first and second ends.

In an example, at least a portion of the one or more flow diverters are shaped towards the upstream portion. In another example, the shape of the one or more flow diverters include a curved portion at a distal end. In yet another example, each end of the one or more flow diverters have different curved portions. In still another example, one or both of the housing and the strainer basket includes a key feature for defining orientation of the strainer basket within the interior of the housing. In an example, at least one of the plurality of electrodes define at least one cross-flow opening that defines a flow path through the respective parallel electrode, or a ratio of a cross-sectional distance of the inlet relative to a chokepoint distance defined between the inlet and the upstream portion is at least 0.5. In another example, a protective sleeve is included in which the plurality of electrodes are received, the protective sleeve being positioned between the plurality of electrodes and the strainer basket.

In another aspect, the technology relates to a biocide-generating device including: a housing having an inlet and an outlet, the housing defining an interior; a strainer basket that removably mounts within the interior of the housing, the basket defining an inlet opening configured to align with the inlet of the housing; and a plurality of electrode plates positioned at least partially within the strainer basket, at least one of the plurality of electrode plates define at least one cross-flow opening, the at least one cross-flow opening allowing flow to pass through the respective electrode plate.

In an example, each of the plurality of electrode plates have an upper portion defined above a reference line, the at least one cross-flow opening positioned within the upper portion. In another example, the plurality of electrode plates include a first set of electrode plates coupled to a first terminal block and a second set of electrode plates coupled to a second terminal block, outside plates of both the first and second sets of electrode plates include the at least one cross-flow opening. In yet another example, inside plates of both the first and second sets of electrode plates do not include the at least one cross-flow opening. In still another example, one or both of the housing and the strainer basket includes a key feature for defining rotational orientation of the strainer basket within the interior of the housing. In an example, one or more flow diverters are disposed within an interstitial space defined between each of the plurality of electrode plates, or a ratio of a cross-sectional distance of the inlet relative to a chokepoint distance defined between the inlet and an upstream end is at least 0.5. In another example, a protective sleeve is included in which the plurality of electrode plates are received, the protective sleeve being positioned between the plurality of electrode plates and the strainer basket.

In another aspect, the technology relates to a biocide-generating device including: a housing having an inlet and an outlet, the housing defining an interior, the inlet having a cross-sectional distance and an inlet edge at least partially defining a boundary of the inlet with the interior of the housing; a strainer basket that removably mounts within the interior of the housing, the basket defining an inlet opening; and a plurality of electrodes positioned at least partially within the strainer basket, each of the plurality of electrodes having an upstream end facing the inlet, at least a portion of the upstream end is angled along a reference plane that is at an oblique angle relative to an axis defined by the inlet, wherein a ratio of the cross-sectional distance of the inlet relative to a chokepoint distance defined between the inlet edge and the upstream end is at least 0.5.

In an example, the chokepoint distance is defined between the inlet edge and the angled portion of the upstream end such that the chokepoint distance is orthogonal relative to the upstream end. In another example, the ratio is between 0.7 and 0.8. In yet another example, the cross-sectional distance is a diameter of the inlet. In still another example, one or more flow diverters are disposed within an interstitial space defined between each of the plurality of electrodes, or at least one of the plurality of electrodes define at least one cross-flow opening that defines a flow path through the respective electrode. In an example, a protective sleeve is included in which the plurality of electrodes are received, the protective sleeve being positioned at least partially between the upstream end of the plurality of electrodes and the inlet edge such that the chokepoint distance is defined between the inlet edge and a surface of the protective sleeve.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows.

DETAILED DESCRIPTION

The present disclosure relates to a biocide-generating devices and systems for inhibiting biofouling within a water system. Example biocides can include chlorine and derivatives thereof, copper, and other biocides. Example biocide-generating devices can include electrolytic cells including electrodes adapted to generate biocides such as chlorine and derivatives thereof when electrical current flows across the electrodes. In certain examples, the biocide-generating devices or systems introduce biocide into the water flowing through the water systems in-situ (e.g., in real time during operation of the water systems). Preferably, the biocide is introduced at a concentration high enough to prevent the growth of biomass within the components of the water system. Example water system components through which the biocide treated water flows can include heat exchangers for air conditioners and chillers.

Figure 1:
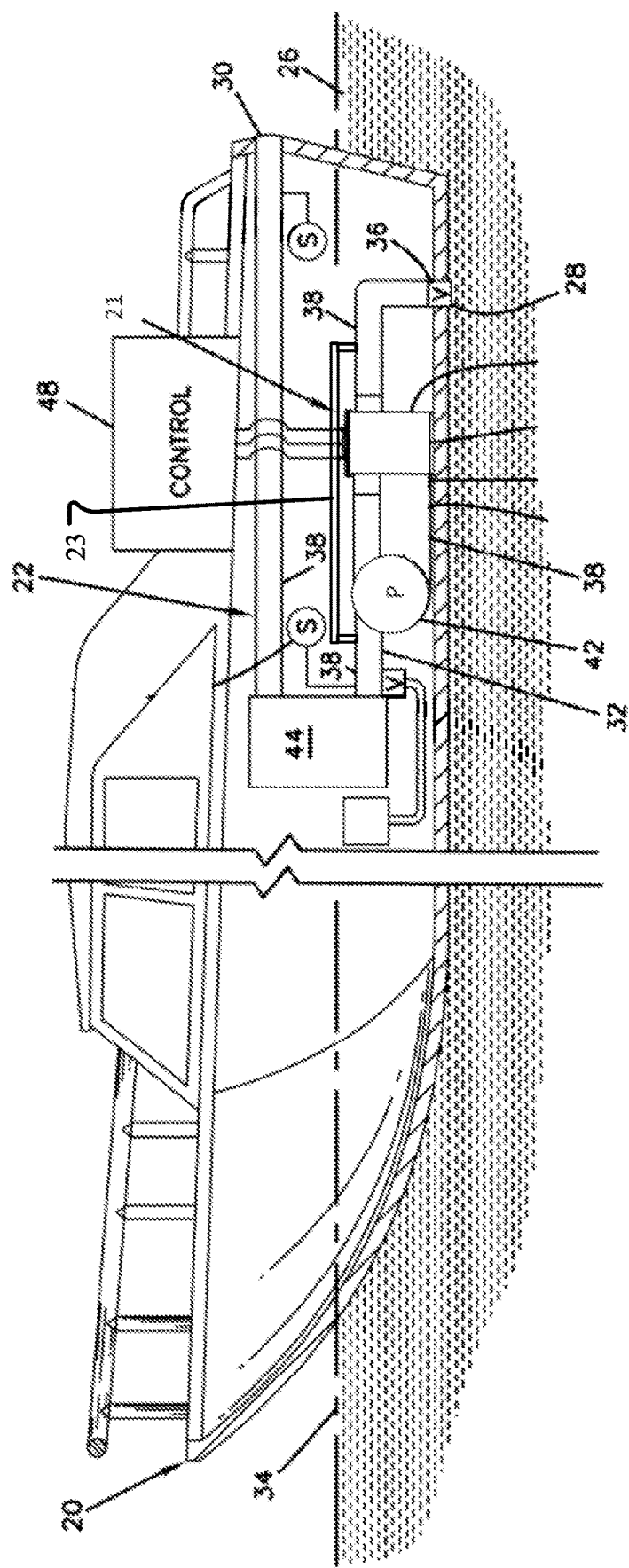
FIG. 1 illustrates a watercraft including an on-board water system incorporating a biocide-generating device including a strainer in accordance with the principles of this disclosure.

FIG. 1 illustrates a watercraft 20 having an on-board water system 22 including a biocide-generating device 21 in accordance with the principles of the present disclosure. The watercraft 20 is shown supported on a body of water 26. The on-board water system 22 includes an inlet 28, an outlet 30, and a water flow path 32 that extends from the inlet 28 through the watercraft 20 to the outlet 30. The inlet 28 is configured for drawing water from the body of water 26 into the water flow path 32. The inlet 28 is located below a water line 34 of the watercraft 20 and is preferably located at a bottom of the hull of the watercraft 20. The inlet 28 can be opened and closed by a valve 36 such as a seacock. The outlet 30 is configured for discharging water that has passed through the water flow path 32 back to the body of water 26. Preferably, the outlet 30 is positioned above the water line 34. The on-board water system 22 can include a plurality of components positioned along the water flow path 32. The water flow path 32 can include a plurality of conduits 38 (e.g., hoses, tubes, pipes, etc.) which extend between the components of the on-board water system 22 and function to carry water along the water flow path 32 between the various components. As shown at FIG. 1, the depicted components include the biocide-generating device 21 (which includes an integrated strainer), a pump 42, and one or more systems and/or equipment 44 that make use of water conveyed through the water flow path 32. The biocide-generating device 21 is adapted for generating a biocide within the water of the water flow path 32 while the water passes through the biocide-generating device 21. The biocide is configured for inhibiting biofouling within the conduits 38 and within one or more of the components positioned along the water flow path 32. It will be appreciated that the biocide can also be referred to as a disinfecting agent or a cleaning agent since the biocide can also include disinfecting and cleaning properties.

It will be appreciated that examples of the type of the systems and/or equipment 44 that can benefit from biocide treatment can include cooling systems such as air conditioners or chillers where water drawn from the body of water 26 can be used as a cooling media for cooling refrigerant of the cooling systems. In other examples, the water from the water flow path 32 can be used to provide engine cooling. In other examples, water from the water flow path 32 can be used for sanitation systems or watercraft propulsion systems.

The depicted strainer, biocide-generating device 21, as can be seen in FIGS. 3-7, is depicted as an electrolytic cell including a housing 52 (e.g., a canister) including a main housing body 54 and a lid 56. The lid 56 is preferably removable from the main housing body 54 and can also be referred to as a cover. In certain examples, the lid 56 is removably mounted at a top of the main housing body 54. In certain examples, fasteners such as bolts, nuts, clips, clamps, or other structures can be used to removably attach the lid 56 to the main housing body 54. The housing 52 includes a longitudinal axis 53 that extends between opposite first and second ends 55, 57 of the housing 52. The second end 57 corresponds to a closed end of the main housing body 54. The lid 56 is located at the first end 55 of the housing 52 and is adapted to cover an open end of the main housing body 54. In examples, the housing 52 and/or the lid 56 may be formed from a non-metal material so as reduce or prevent corrosion on the biocide-generating device 21. In an aspect, the housing 52 and/or the lid 56 may be formed from a plastic-type material.

A strainer 61 mounts within an interior of the housing 52. It will be appreciated that a water strainer is a device that mechanically filters the water drawn into the water flow path 32 to prevent undesirable material (e.g., particulates over a certain size) from passing through the water flow path 32. It will be appreciated that the strainer 61 can be periodically removed from the housing 52, cleaned and then returned to the interior of the housing 52. It will be appreciated that different strainers can have different levels of filtration ranging from coarse to fine. Typically the undesirable material floats on the water surface or right below the water surface and can include organic and/or non-organic material. In examples, seaweed, such as sargassum, may be within the water flow path 32.

The main housing body 54 includes a water inlet 58 and a water outlet 60. As depicted, the water inlet 58 and the water outlet 60 are co-axially aligned along an axis 63 that is transversely oriented with respect to the longitudinal axis 53 of the housing 52. The axis 63 is located at an upper third of a length of the housing 52 that extends between the first and second ends 55, 57. In another aspect, the axis 63 is located at an upper half of a length of the housing 52 that extends between the first and second ends 55, 57. In yet another aspect, the axis 63 is located at an upper quarter of a length of the housing 52 that extends between the first and second ends 55, 57.

In other examples, the water inlet 58 and the water outlet 60 may not be co-axial along the axis 63. In an aspect, both the water inlet and outlet 58, 60 are located at an upper third of a length of the housing 52 that extends between the first and second ends 55, 57. In another aspect, both the water inlet and outlet 58, 60 are located at an upper half of a length of the housing 52 that extends between the first and second ends 55, 57. In yet another aspect, both the water inlet and outlet 58, 60 located at an upper quarter of a length of the housing 52 that extends between the first and second ends 55, 57.

In still other examples, centerline axes of each of the water inlet 58 and the water outlet 60 are not offset relative to one another in a vertical direction (e.g., between the first and second ends 55, 57) more than 50% of a greatest cross-sectional length of the water inlet 58 or water outlet 60. In an aspect, the greatest cross-sectional length of the water inlet 58 or water outlet 60 may be a diameter of the water inlet 58 or water outlet 60. In another aspect, the centerline axes of each of the water inlet 58 and the water outlet 60 are not offset relative to one another in a vertical direction more than 40%, 30%, 20%, 10%, or 5% of a greatest cross-sectional length of the water inlet 58 or water outlet 60 as required or desired. In still another aspect, the centerline axes of each of the water inlet 58 and water outlet 60 may be offset in a horizontal direction.

Generally, the water inlet 58 may be positioned towards the first end 55 of the housing 52 so that collection can occur towards the second end 57 and within the strainer 61. In an aspect, the water outlet 60 may be poisoned anywhere between the first and second ends 55, 57 of the housing 52, including below the water inlet 58, as required or desired. As illustrated, the housing 52 may be considered a side-in, side-out container with both the water inlet 58 and the water outlet 60 formed on the sidewall of the housing 52. In other examples, the housing 52 may be a bottom-in, side-out container with the water inlet 58 at the second end 57 and the water outlet 60 formed on the sidewall of the housing 52.

Figure 16:
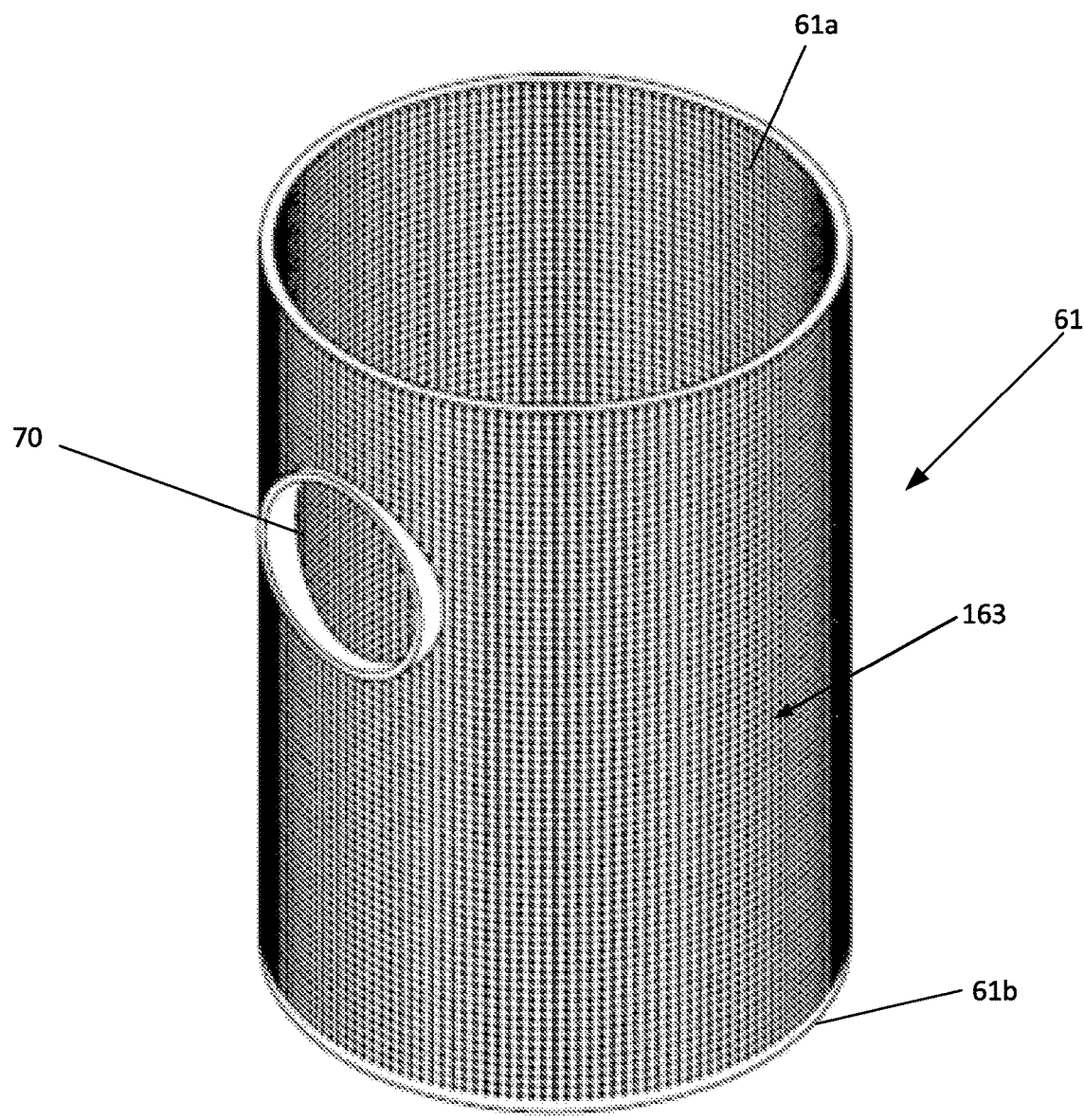
FIG. 16 is the strainer of the biocide-generating device of FIG. 1 shown in isolation.
Figure 17:
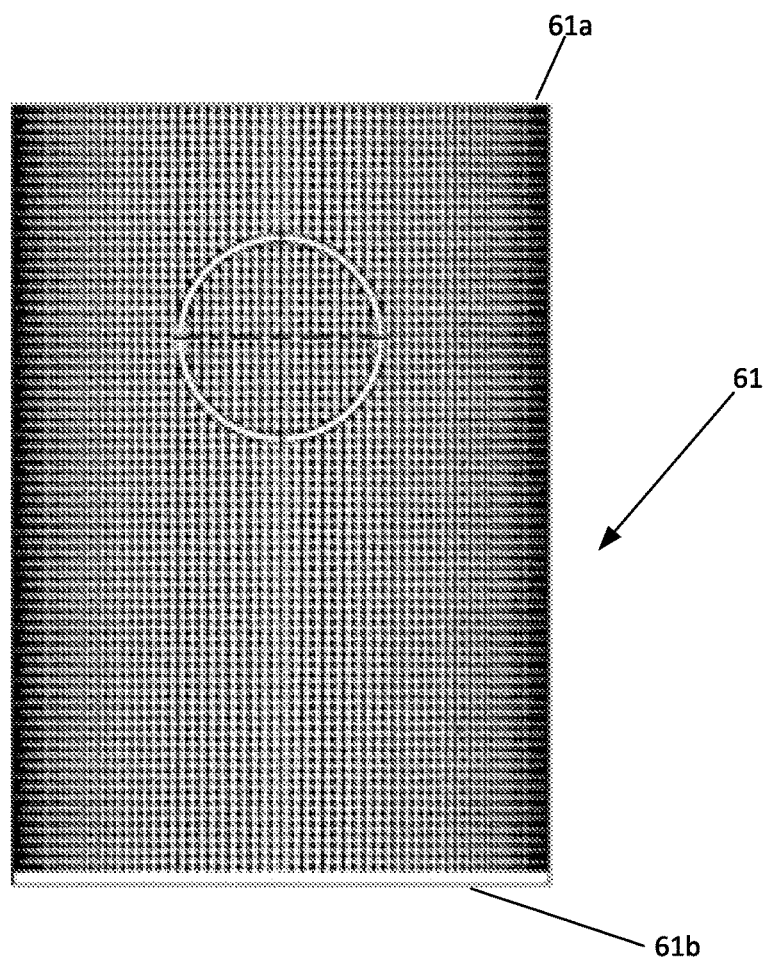
FIG. 17 is a front view of the strainer of FIG. 16.
Figure 18:
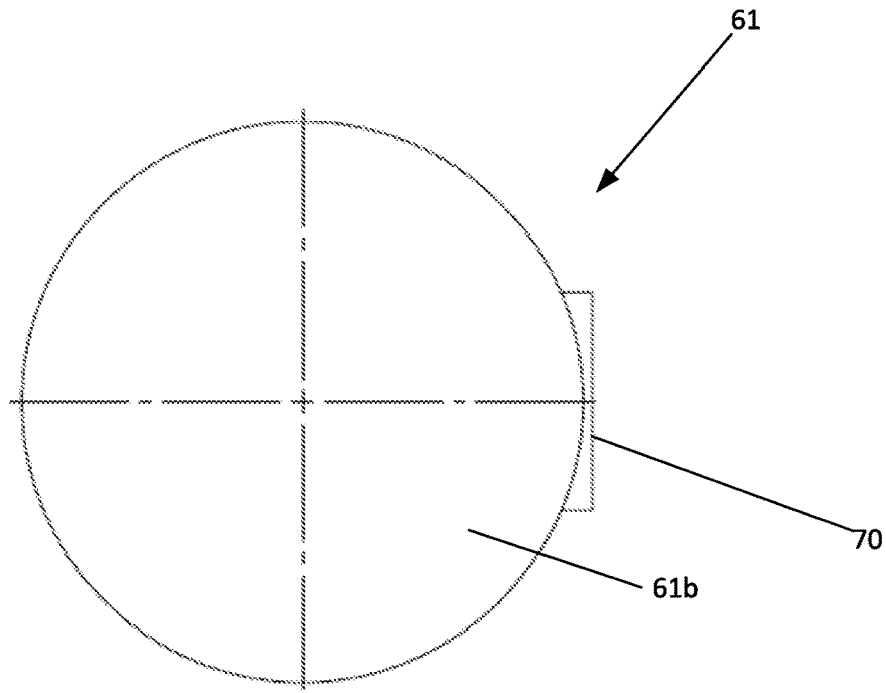
FIG. 18 is a bottom view of the strainer of FIG. 16.

As described above, the strainer 61 removably mounts within the interior of the housing 52. As depicted in FIGS. 16-18, the strainer 61 has a basket-like configuration having an open end 61*a* adapted to be positioned adjacent the top of the housing 52 and a closed end 61*b* adapted to be positioned adjacent the bottom of the housing 52. An inlet opening 70 is defined through the side of the strainer 61. When the strainer 61 mounts within the housing 52, the inlet opening 70 preferably aligns with the water inlet 58 of the main housing body 54. Thus, in use, water being conveyed through the water flow path 32 enters the housing 52 through the water inlet 58 and enters an interior of the strainer 61 through the inlet opening 70. The water then passes through straining openings 163 (e.g., openings sized to provide a desired level of water filtration) of the strainer 61 and exits the housing 52 through the water outlet 60. In certain examples, a radial spacing between the strainer 61 and the interior of the housing 52 provides an annular flow region for accommodating the flow of water that has passed through the straining openings of the strainer 61 and is flowing toward the outlet 60. Particulate material strained out of the water by the strainer 61 remains on an inside of the strainer 61. When the strainer 61 is removed from the housing 52, the strained material remains on the inside of the strainer 61 and is preferably removed during cleaning. The strainer 61 has an open end 61*a* and a closed end 61*b*. In this particular example, the strainer 61 is cylindrical in shape, in other examples the strainer 61 can have a taper as the strainer extends from the open end 61*a* to the closed end 61*b*. The strainer 61 can be different depending upon the shape of the biocide-generating device 21.

The biocide generating device includes an electrode arrangement 72 that fits within the interior of the strainer 61 within the interior of the housing 52. In the depicted example, the electrode arrangement 72 includes a first electrode 74 and a second electrode 76. The first electrode 74 includes a first terminal 78 electrically coupled to a plurality of parallel first electrode plates 80. The first terminal 78 includes a first terminal block 82 and a first terminal post 84. The first electrode plates 80 are electrically and mechanically coupled to the first terminal block 82. In one example, the first electrode plates 80 include main bodies 86 and upper tabs 88. The upper tabs 88 are preferably electrically and mechanically coupled to the first terminal block 82 by means such as welding or soldering. In certain examples, the first terminal 78 and the first electrode plates 80 can have metal constructions that include a metal material such as titanium. In certain examples, the first electrode plates 80 can be coated with a catalyst material.

The second electrode 76 of the electrode arrangement 72 has a similar configuration as the first electrode 74. For example, the second electrode 76 includes a second terminal 90 and second electrode plates 92 that are electrically and mechanically coupled to the second terminal 90. In a preferred example, the second terminal 90 and the second electrode plates 92 have metal constructions that may include a metal material such as titanium. The second electrode plates 92 are positioned between the first electrode plates 80 and spaced-apart in relation relative to the first electrode plates 80 such that interstitial space exists between each of the first electrode plates 80 and a corresponding one of the second electrode plates 92. The second terminal 90 includes a second terminal block 94 electrically and mechanically coupled to upper tabs 96 of the second electrode plates 92. The second electrode plates 92 also include main bodies 98 and the second terminal 90 includes a second terminal post 93. In certain examples, the second electrode plates 92 can be coated with a catalyst material.

The first and second electrode plates 80, 92 of the electrode arrangement 72 are coupled together by a plurality of fasteners. In a preferred example, fasteners are dielectric fasteners that do not provide electrical connectivity between the first and second electrode plates 80, 92. In certain examples, the fasteners are bolts that extend through openings defined in the electrode plates 80, 92. In certain examples, dielectric spacers are provided on the fasteners at locations between the first and second electrode plates 80, 92. The dielectric spacers function to maintain a desired spacing between each of the opposing sides of the first and second electrode plates 80, 92. Other aspects of the spacers and fasteners are discussed in U.S. Pat. No. 11,027,991 which is incorporated herein by reference in its entirety.

In certain examples, the terminal posts, the terminal blocks and the terminal plates can have metal constructions that include a metal material such as titanium or stainless steel. In certain examples, first and second electrode plates 80, 92 can be coated with a catalyst material for catalyzing the production of chlorine or derivatives thereof. In one example, the catalyst coating can include a platinum group metal. Example platinum group metals suitable for use in a catalyst coating include iridium and ruthenium. In certain examples, the catalyst coating may include metal oxide mixtures that can include oxides of iridium, and/or oxides of ruthenium and/or oxides of titanium and/or oxides of tantalum and/or oxides of niobium. It will be appreciated that the above catalysts are merely examples and that other catalyst mixtures can also be used. In other examples, at least one of the sets of the first and second electrode plates 80, 92 is constructed of a material that includes copper such that copper ions are generated when voltage is applied across the first and second electrode plates 80, 92.

In a preferred example, the electrode arrangement 72 is mounted to the lid 56 of the housing 52. The first and second electrode plates 80, 92 are secured at a bottom/under side of the lid 56 and project downwardly from the inner side of the lid 56. When the lid 56 is mounted on the main housing body 54, the electrode plates 80, 92 fit within the interior of the housing 52 and within the interior of the strainer 61. During operation of the on-board water system 22, the interior of the housing 52 fills with water such that the first and second electrode plates 80, 92 are preferably fully submerged within the water flowing through the housing 52. The electrode arrangement 72 is preferably coupled to the lid 56 such that the electrode arrangement 72 is carried with the lid 56 when the lid 56 is removed from the main housing body 54. When it is desired to clean the strainer 61, the lid 56 is removed from the main housing body 54 to provide access to the strainer 61. When the lid 56 is removed, the electrode arrangement 72 is carried with the lid 56 and concurrently removed from the interior of the strainer 61 so as to not interfere with the subsequent removal of the strainer 61 for cleaning.

Figure 8:
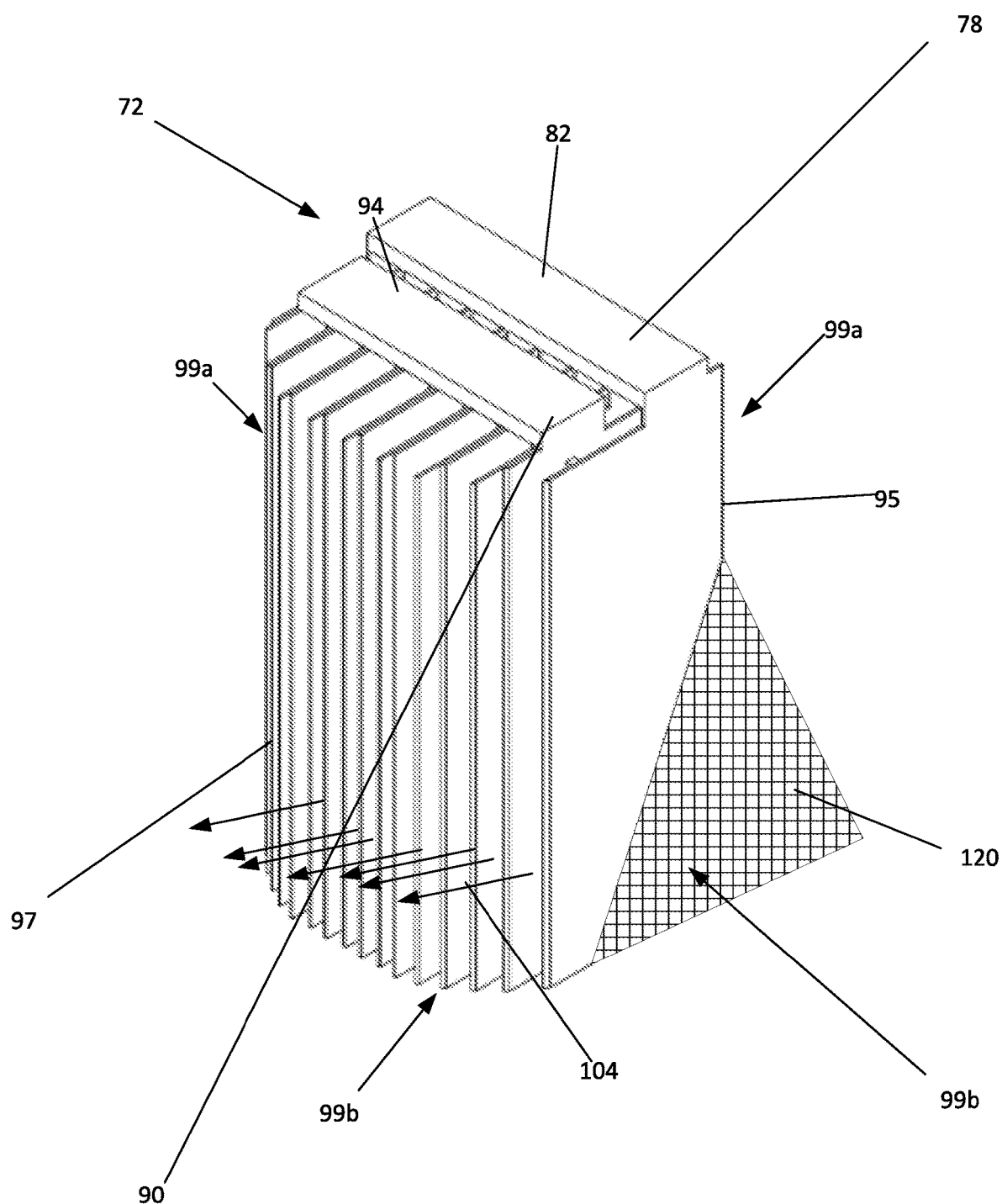
FIG. 8 is an electrolytic cell of the biocide-generating device of FIG. 1 in isolation.
Figure 9:
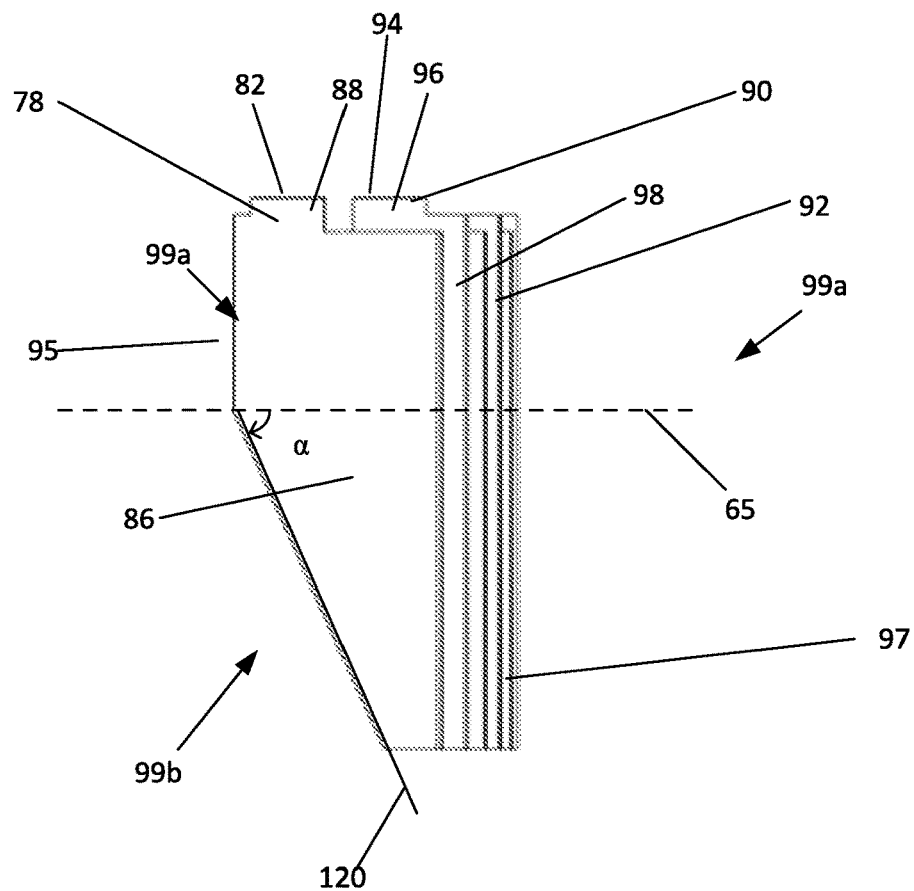
FIG. 9 is a side view of the electrolytic cell of FIG. 8.
Figure 10:
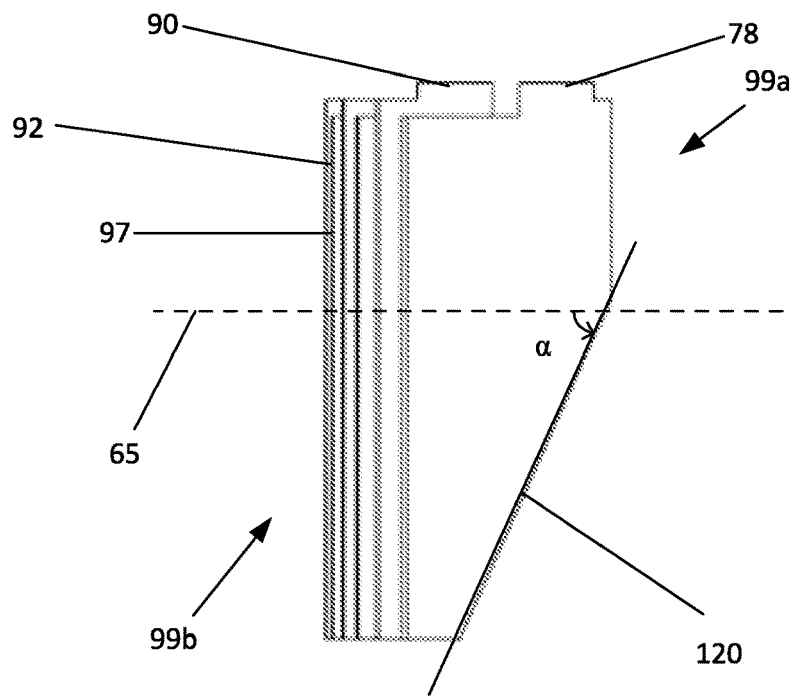
FIG. 10 is a side view of the electrolytic cell of FIG. 8.

In a preferred example, water flowing through the strainer 61 flows through the interstitial space between the first and second electrode plates 80, 92 in a direction shown by arrows 104 (see FIG. 8). In certain examples, the first and second electrode plates 80, 92 are located within the strainer 61 with open ends of the interstitial spaces between the electrode plates 80, 92, facing toward the inlet opening 70 of the strainer 61 and in alignment with the water inlet 58 of the housing 52. In one example, the electrode plates 80, 92 are oriented parallel with respect to the axis 63.

Figure 2:
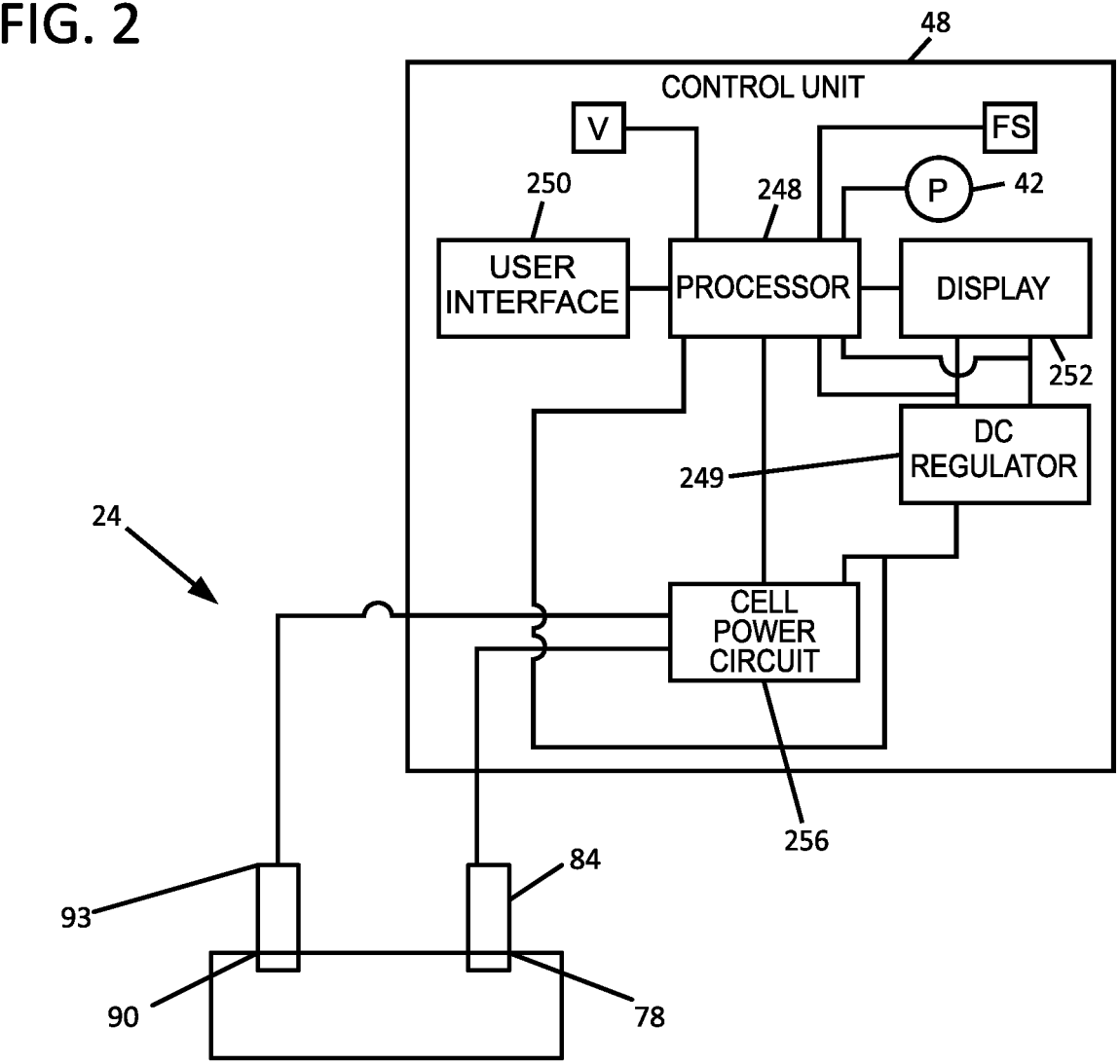
FIG. 2 schematically depicts an electrolytic cell and control unit of the biocide-generating device of FIG. 1.
Figure 3:
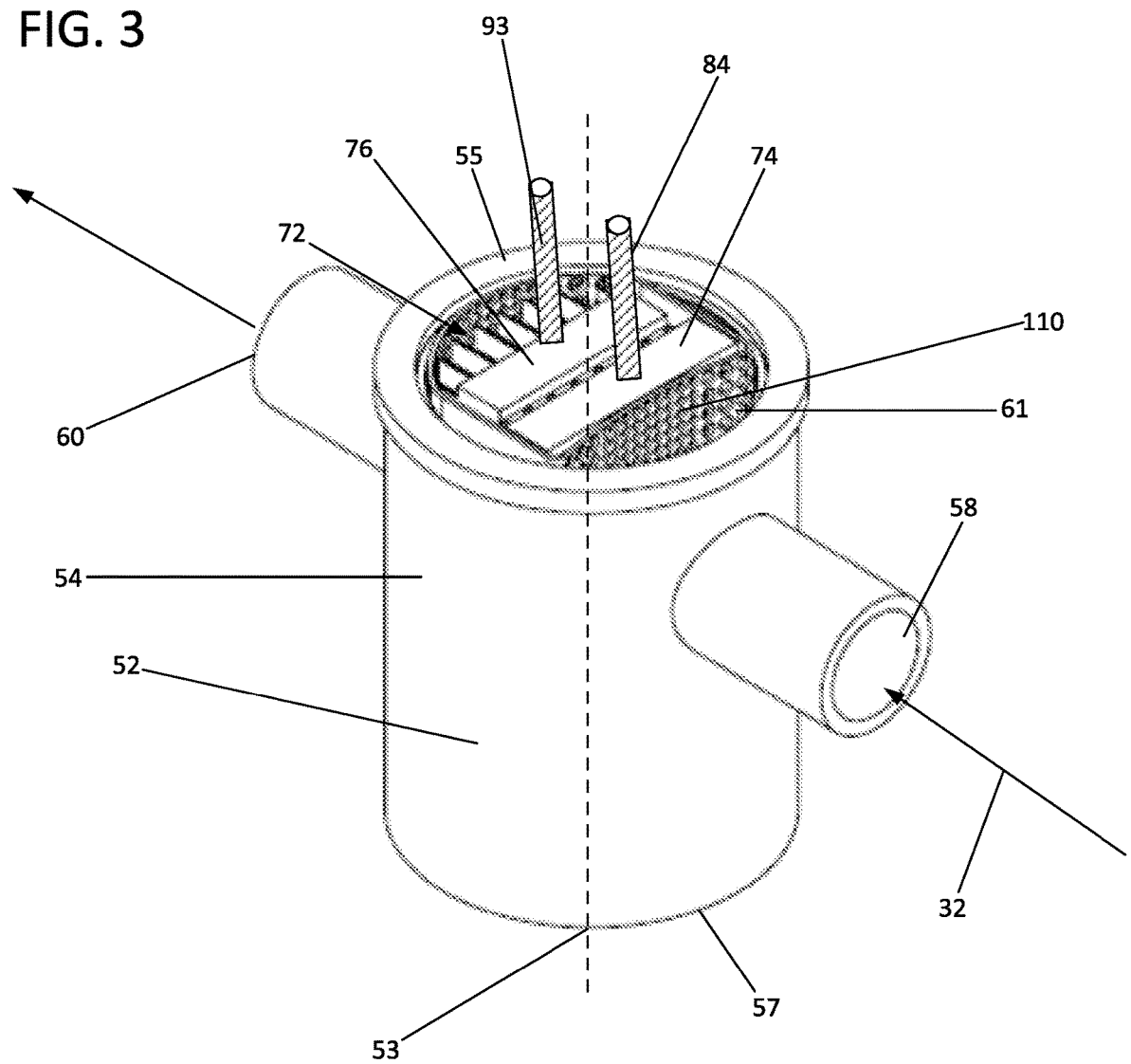
FIG. 3 is the biocide-generating device from the watercraft of FIG. 1 in isolation.
Figure 4:
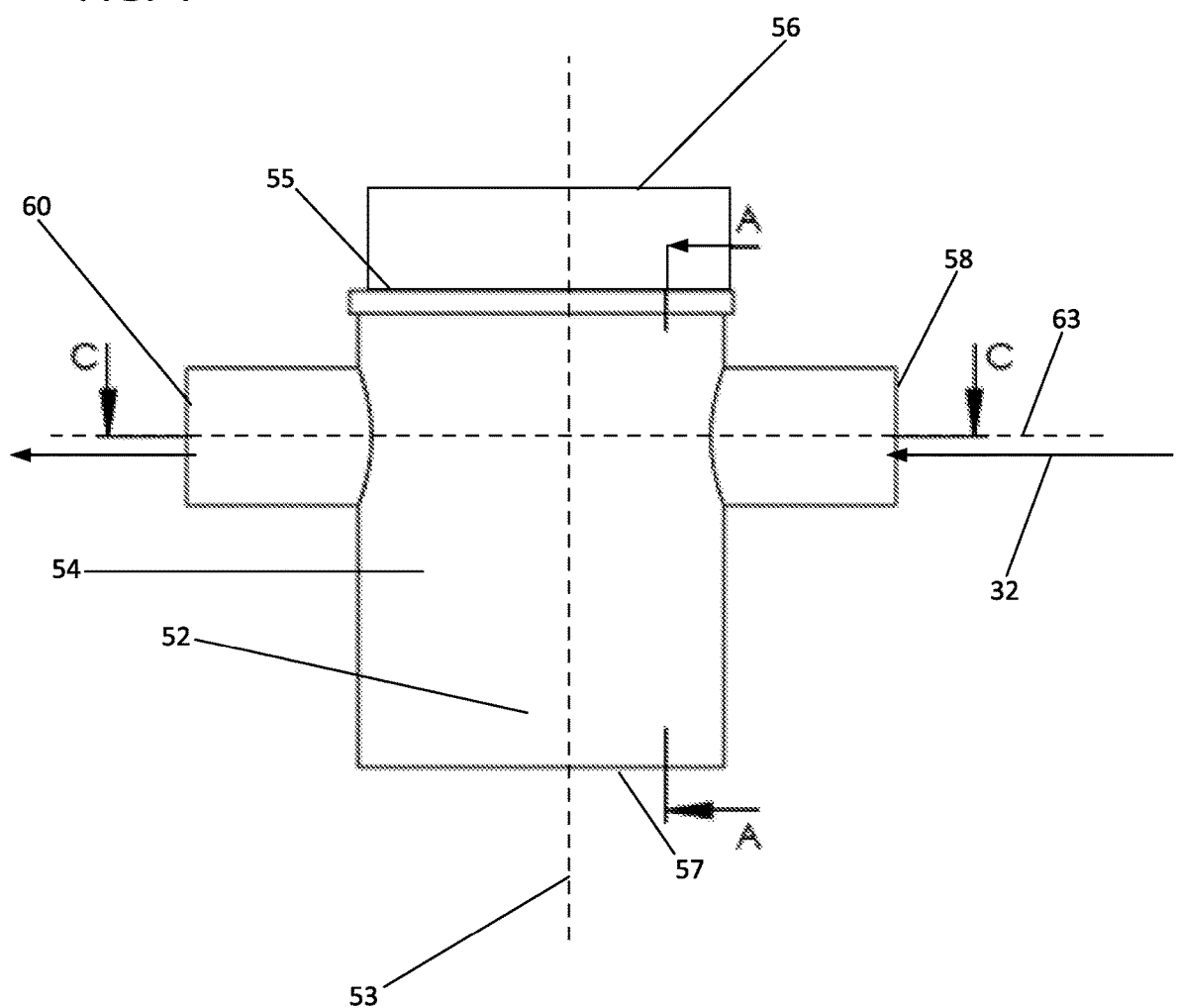
FIG. 4 is a side view of the biocide-generating device of FIG. 3.

The biocide generating device can be controlled by a control system, schematically depicted at FIG. 2, which may include a controller 48 for controlling various functions. Example functions include: a) power conversion (e.g., DC-DC and/or AC-DC power conversion); b) power regulation (the depicted example shows a DC power regulator 249 attached to a cell power circuit 256); c) electrode polarity switching; d) periodically terminating power to the electrodes and connecting the electrodes together and to a zero reference voltage; e) isolating the circuitry from boat ground; f) gas sensing; g) monitoring water flow through the biocide-generating device 21; and h) and adjusting the magnitude of the electrical current flowing across the electrodes based on the water flow through the first chamber 24. To coordinate and implement this various functionality, the control system can include a controller 48 having one or more processors 248. The processors 248 can interface with software, firmware, and/or hardware. Additionally, the processors 248 can include digital or analog processing capabilities and can interface with memory (e.g., random access memory, read-only memory, or other data storage). In certain examples, the processors 248 can include a programmable logic controller, one or more microprocessors, or like structures. The processors 248 can also interface with displays 252 (e.g., indicator lights, etc.) and user interfaces 250 (e.g., control buttons, switches, etc.) mounted at an exterior of the unit housing 52. Other functions of the control system are discussed in U.S. Pat. No. 11,027,991.

Figure 11:
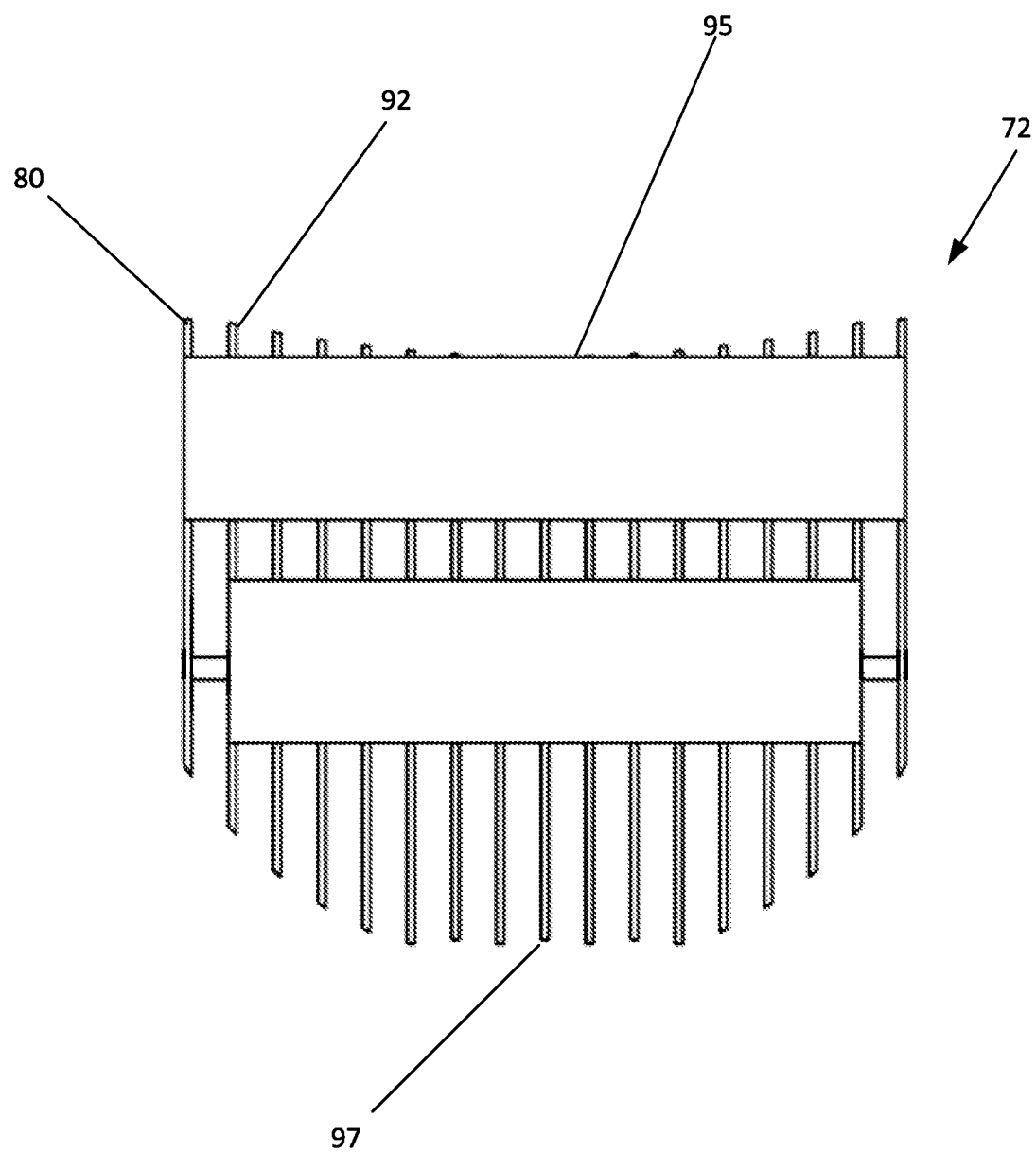
FIG. 11 is a top view of the electrolytic cell of FIG. 8.
Figure 12:
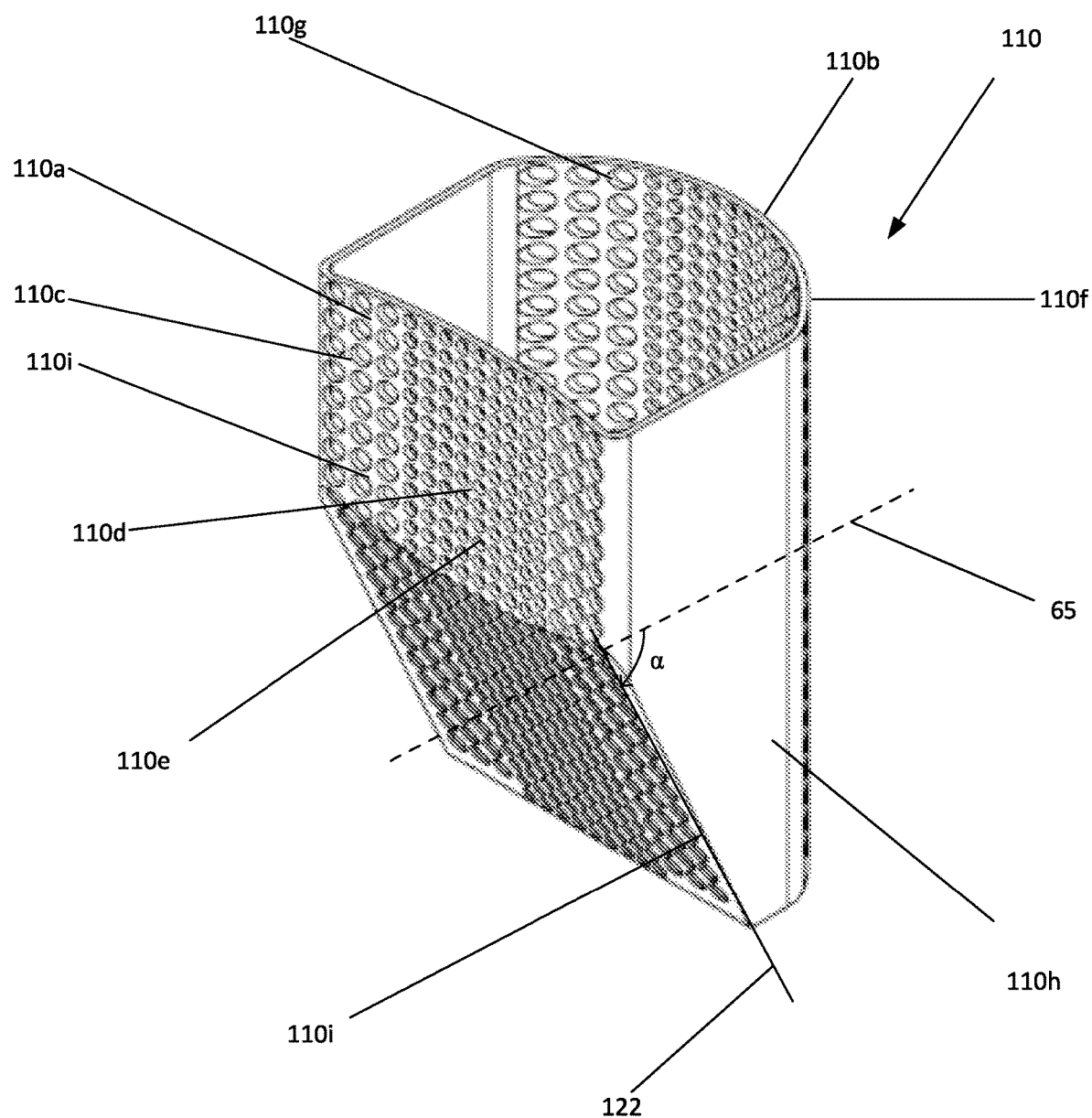
FIG. 12 is a protective sleeve which fits around the electrolytic cell of the biocide-generating device of FIG. 8 in isolation.
Figure 13:
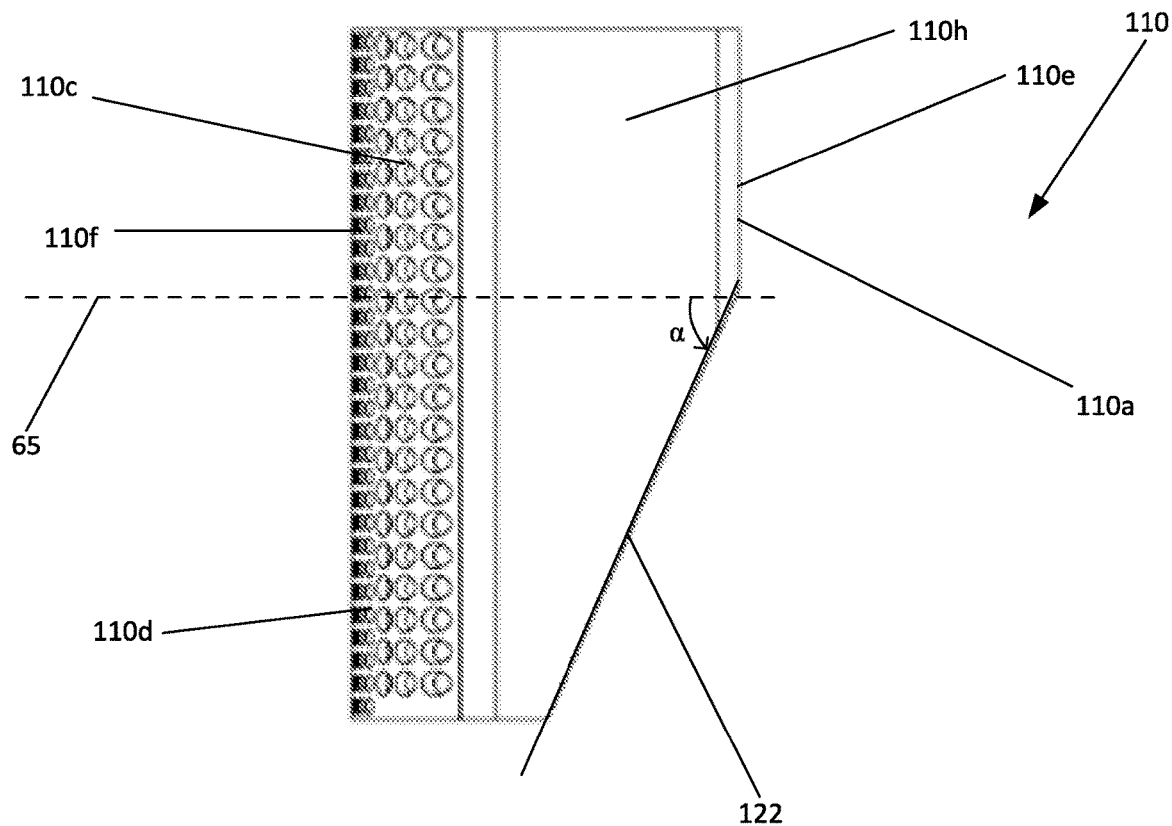
FIG. 13 is a side view of the sleeve of FIG. 12.

In some examples, the electrode plates 80, 92, as seen in FIGS. 8-11, include upstream ends 95 and downstream ends 97. The upstream ends 95 face the inlet 28 and the downstream ends 97 face the outlet 60. The electrode plates 80, 92 additionally include upper portions 99a above a reference line 65 which is parallel to the axis 63 and lower portions 99b below the reference line 65. The upper portions 99a of the upstream ends 95 of the electrode plates 80, 92 define a concave shape when viewed from above (as can be seen in FIG. 11). In some examples, the upper portions 99a, and lower portions 99b of the downstream ends 97 of electrode plates 80, 92 are each unitary and cooperate to define a convex shape when viewed from above.

Figure 5:
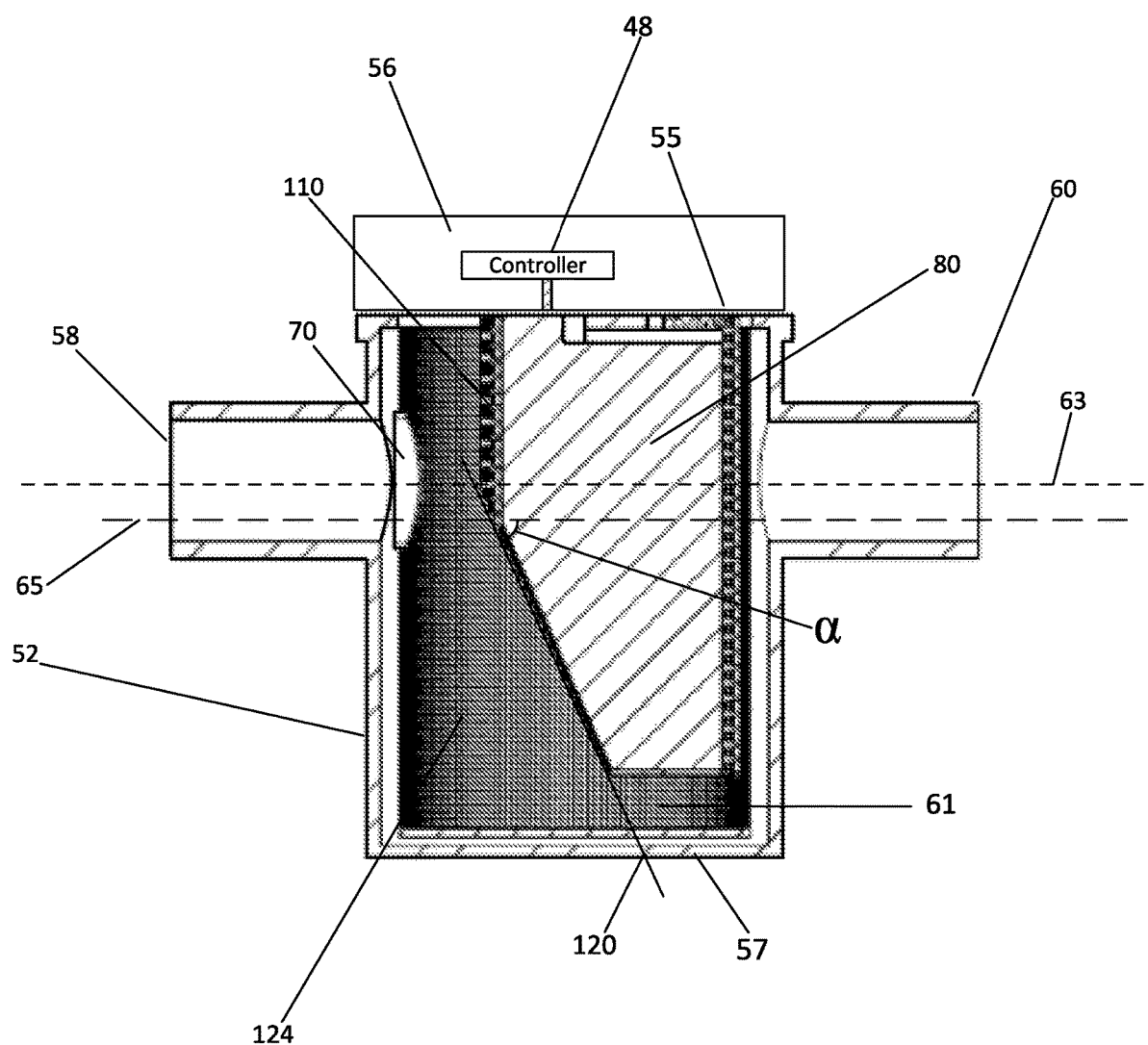
FIG. 5 is a cross-sectional view of the biocide-generating device of FIG. 3.
Figure 6:
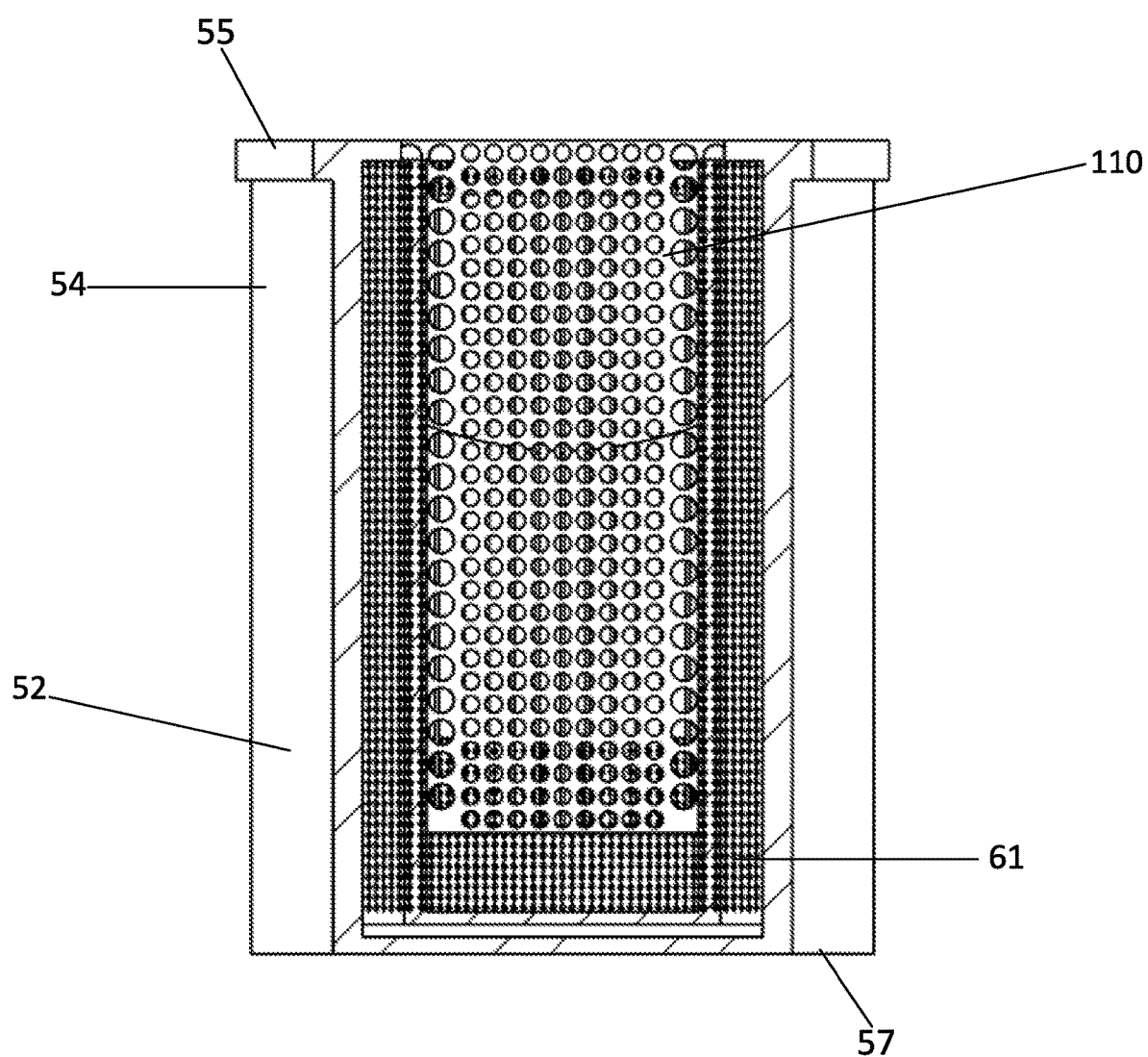
FIG. 6 is a cross-sectional view of the biocide-generating device of FIG. 3 taken along section A-A shown in FIG. 4.
Figure 7:
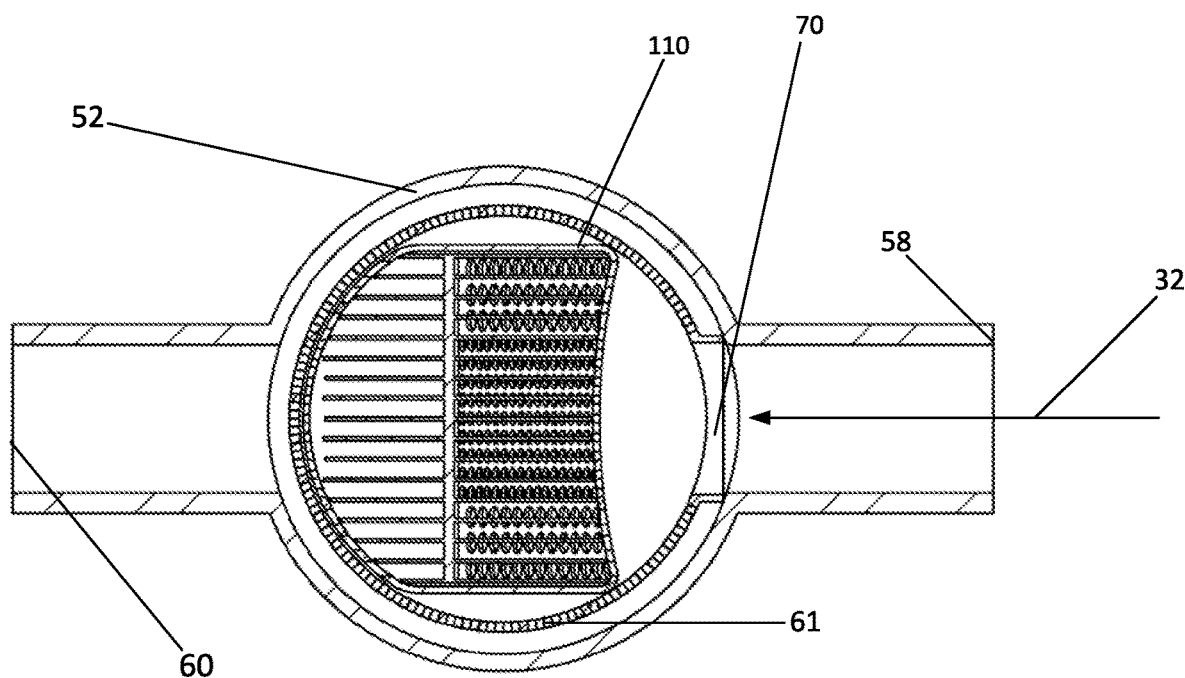
FIG. 7 is a cross-sectional view of the biocide-generating device of FIG. 3 taken along section C-C shown in FIG. 4.

In some examples, lower portions 99b of the upstream ends 95 are oriented along a reference plane 120 aligned at an oblique angle α with respect to the axis 63. The reference plane 120 angles toward the outlet side of the housing 52 as the plane extends in a downward direction. As can be seen at FIG. 5, the bottom end of electrode assembly is offset from bottom of strainer 61 basket to provide space for debris collection. In some embodiments, the angled shape of electrodes defined by the oblique angle α provides space for debris collection within the strainer 61 at a collection space 124 under the inlet 58. The oblique angle α is between 10° and 80°. In aspects, the oblique angle α may be between 20° and 70°. The oblique angle α may be between 30° and 60°. The oblique angle α may be between 45° and 60°. The oblique angle α may be between 45° and 70°. The oblique angle α may be between 45° and 80°. The oblique angle α may be greater than 45°, greater than 50°, greater than 55°, or greater than 60°.

In some examples, the electrode plates 80, 92 are protected by protective sleeve 110 as seen in FIGS. 12-15. Preferably, the protective sleeve 110 has a dielectric construction (e.g., a material such as polyvinyl chloride, nylon, polytetrafluoroethylene, polycarbonate etc.). The protective sleeve 110 has an upstream side 110a and a downstream side 110b with openings 110c for allowing water to flow through the protective sleeve 110 and between the electrode plates 80, 92. The openings 110c are and adapted for assisting in distributing flow across the surfaces of the electrode plates 80. In some examples, the openings 110c are larger away from a middle section 110d towards side sections 110i and smaller towards the middle section 110d which assists with distributing the water flow. When viewed from the top, the middle section 110d is between two side section 110i. In some examples, the openings 110c are larger than the straining openings 163 of the strainer 61, but smaller than the spacings between the electrode plates 80, 92. It is appreciated, that in certain examples, the electrode plates 80, 92 are disposed within the strainer 61 without use of the protective sleeve 110.

Figure 14:
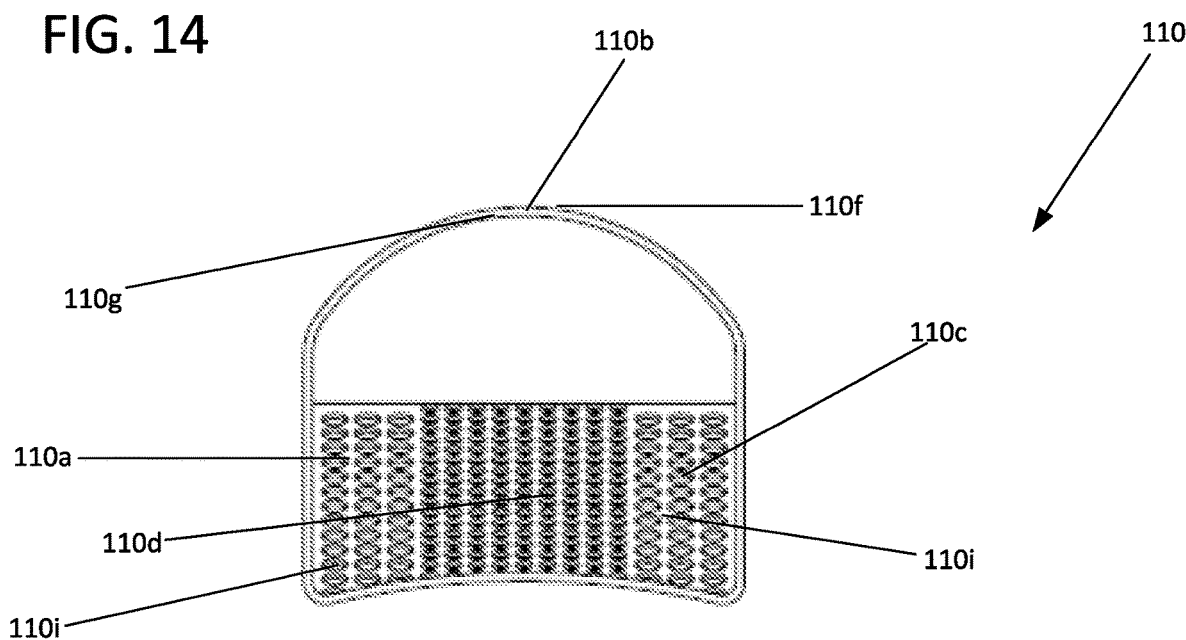
FIG. 14 is a top view of the sleeve of FIG. 12.
Figure 15:
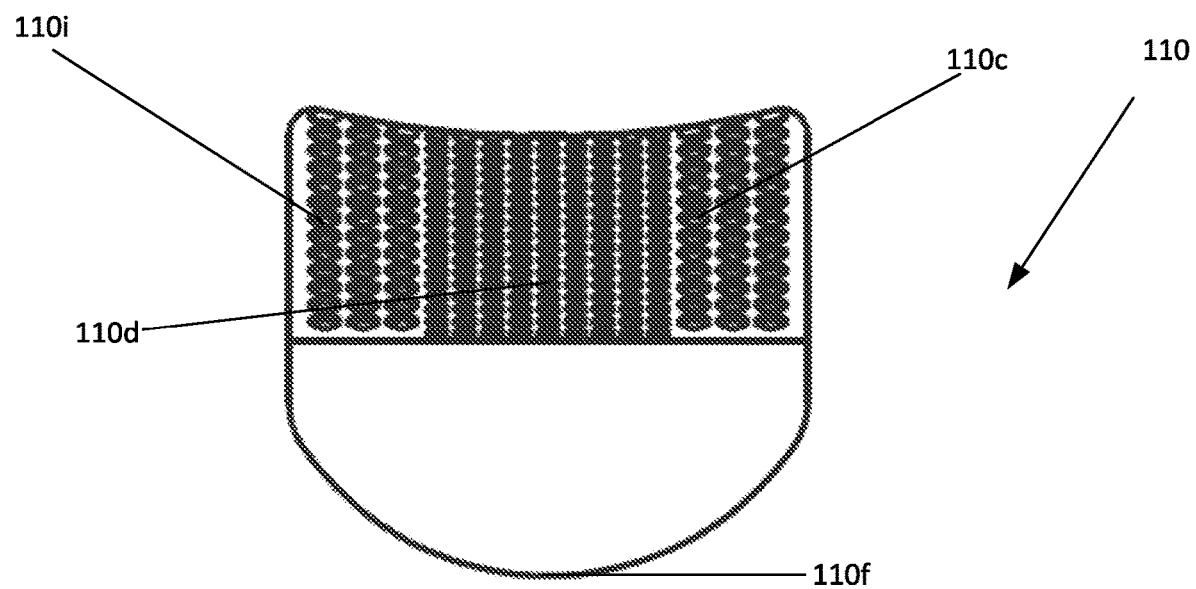
FIG. 15 is a bottom view of the sleeve of FIG. 12.

In some examples, the downstream side 110b of the protective sleeve 110 has a convex exterior 110f and concave interior 110g when viewed from the top/bottom (see FIGS. 14 and 15). The concave interior 110g allows the convex shape defined by downstream ends 97 of the electrode plates 80, 92 to fit within the protective sleeve 110 (e.g., match the inner contour of the protective sleeve 110). In some examples, the upstream side 110a faces towards the inlet and includes an upright portion 110e that is intersected by the axis 63 and is above the reference line 65 includes a concave exterior and a convex interior when viewed from the top/bottom which allows the concave shape of the upper portion 99a of the upstream ends 95 of the electrodes to fit within the protective sleeve 110. The lower portion, below the reference line 65, of upstream side 110a extends along a reference plane 122 which extends on the angle α (e.g., parallel to reference plane 120). In some examples, the protective sleeve 110 includes walls 110h that extend between the upstream and downstream sides 110a, 110b do not have openings.

The interior shape of the protective sleeve 110 complements the outer shape of the electrode arrangement 72. As discussed above, when the electrode plates 80, 92 are mated within the sleeve, the convex interior of the upright portion 110e of the protective sleeve 110 fits above and with the concave shape of the upstream ends 95 of the electrode plates 80, 92. The concave interior 110g of the downstream side mates with the convex shape defined by the upstream ends 95 of the electrode plates 80, 92. Additionally, the lower portion 99b of the upstream ends of the first and second electrode plates 80, 92 mates within the lower portion of the upstream side 110a of the protective sleeve 110 as the reference planes 120, 122 are parallel with one another and configured to fit with one another.

In some examples, debris flows with water into the biocide-generating device 21 and into the strainer 61 through the inlet opening 70, as the inlet opening 70 of the strainer 61 is coaxially aligned with the inlet 58 of the biocide-generating device 21. Smaller debris can flow through the openings 110c and larger debris is deflected below the reference plane 122 that defines the upstream side 110a of the protective sleeve 110 collects in the collection space 124 (seen easily in FIG. 5). The strainer 61 has smaller openings 110c, as discussed above, such that the debris larger than the openings 110c which enters the strainer 61 cannot exit the outlet 60 of the biocide-generating device 21, but instead is captured in the interior of the strainer 61.

Figure 19:
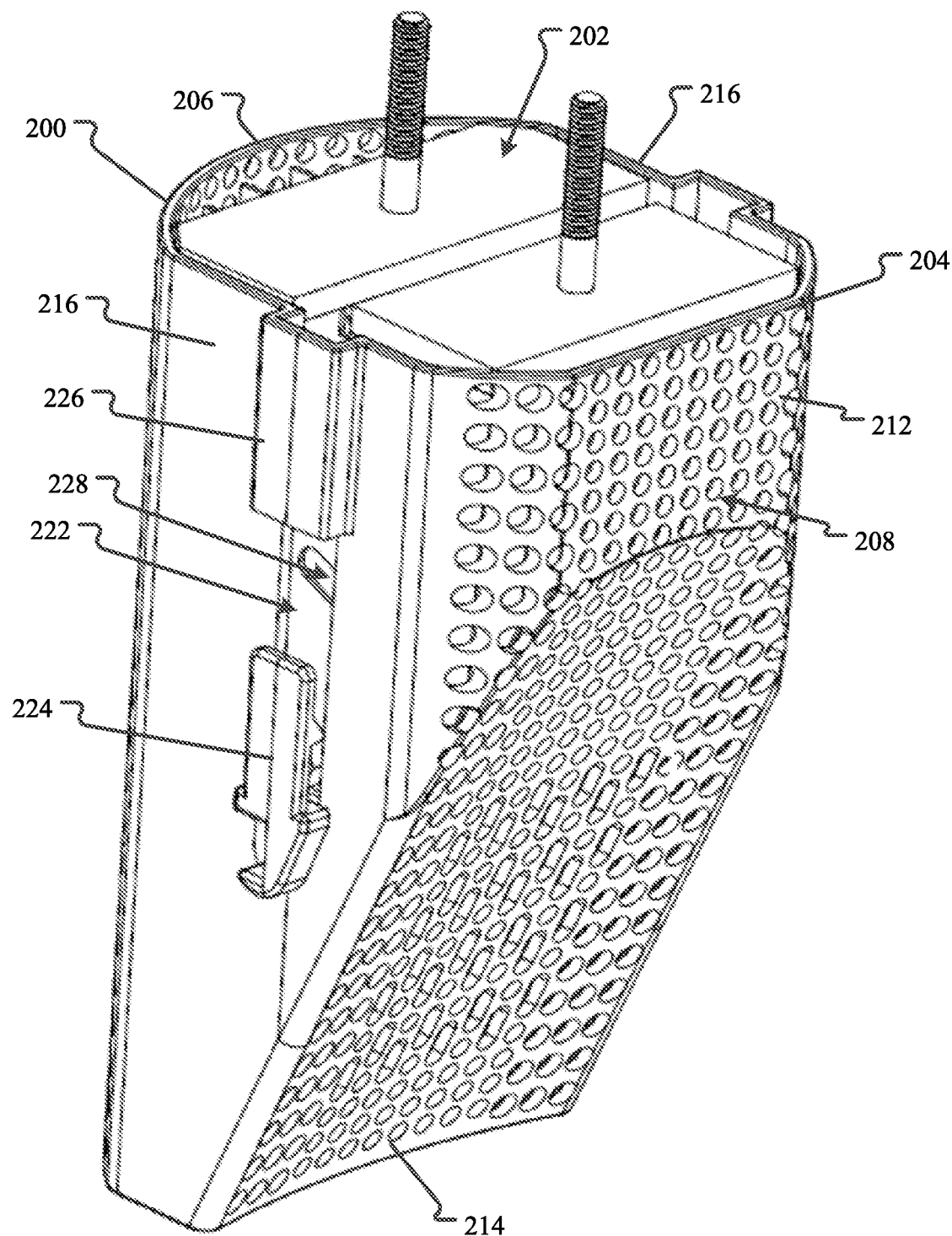
FIG. 19 is a perspective view of another protective sleeve and electrolytic cell that can be used with the biocide-generating device of FIG. 1.
Figure 20:
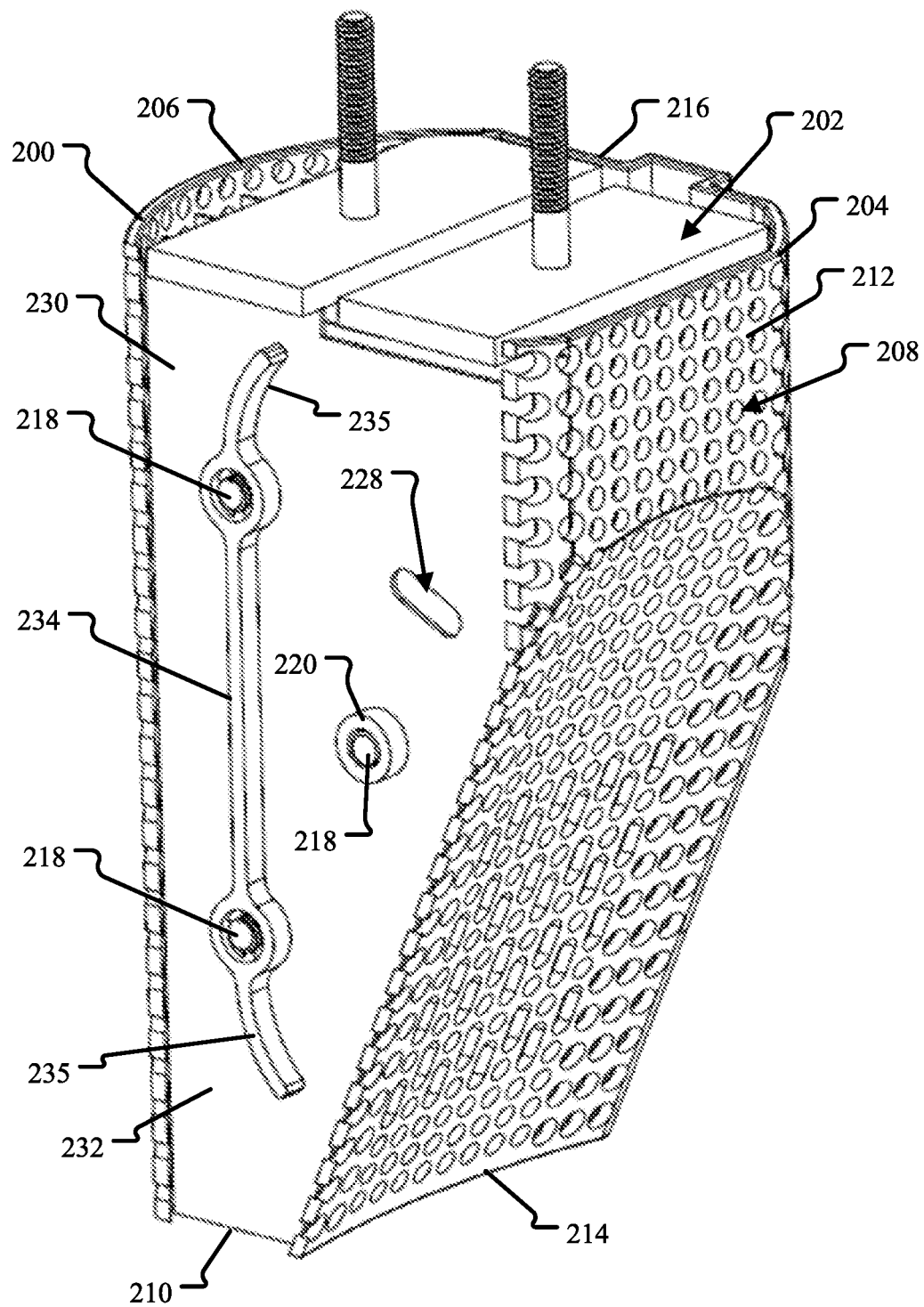
FIG. 20 is a cross-sectional perspective view of the protective sleeve and electrolytic cell of FIG. 19.

FIG. 19 is a perspective view of another protective sleeve 200 and electrolytic cell 202 that can be used with the biocide-generating device 21 (shown in FIG. 1). FIG. 20 is a cross-sectional perspective view of the protective sleeve 200 and electrolytic cell 202. Referring concurrently to FIGS. 19 and 20, the protective sleeve 200 has an upstream side 204 and a downstream side 206 with openings 208 for allowing water to flow through the protective sleeve 200 and between electrode plates 210 of the electrolytic cell 202 as described above. The openings 208 may have different sizes and/or shapes between a middle section and the side sections so as to at least partially control water flow as required or desired. In an aspect, at least some openings 208 in the middle section may be elongated in a top-bottom direction. While the electrolytic cell 202 is shown in combination with the protective sleeve 200, in examples, the electrolytic cell 202 may be used without the protective sleeve 200 within the biocide-generating device 21 and the electrolytic cell 202 is placed directly into the strainer.

As illustrated, the upstream side 204 includes an upright portion 212 being at least partially planar and a lower portion 214 extending at an angle. In an aspect, the lower portion 214 may have a convex exterior and a concave interior. The protective sleeve 200 also includes a pair of walls 216 that extend between the upstream and downstream sides 204, 206 and parallel to the electrode plates 210.

The electrode plates 210 may be coupled together by one or more fasteners 218 that orthogonally extend through the plates. Spacers 220 may be positioned around the fastener 218 and be used to define the dielectric spacing between the electrode plates 210. The distal ends of the fasteners may include a bolt head/nut or the like and that extends outward from the outside electrode plate.

In the example, one or more of the fasteners 218 are used to releasably secure the electrolytic cell 202 at least partially within the protective sleeve 200. Each of the walls 216 has an open channel 222 defined therein. The open channel 222 extends from a top end of the protective sleeve 200 and terminates prior to reaching the bottom end. In an aspect, the open channel 222 is parallel to the longitudinal axis 53 (shown in FIG. 3) of the housing of the device. The open channel 222 is shaped and sized so as to at least partially receive the end portions of the fastener 218 and guide the receipt of the electrolytic cell 202 within the protective sleeve 200. A bottom end of the open channel 222 may include a latch 224 that is configured to releasably secure the end portions of the fastener 218 and the electrolytic cell 202 within the protective sleeve 200. In an example, an elongated tool such as a flat head screwdriver may be used to release the latch 224 and allow the electrolytic cell 202 to be removed. A bracket 226 may be disposed at the top end of the open channel 222 and at least partially cover the channel. The bracket 226 can be used to align the fastener 218 within the open channel 222. In the example, the bracket 226 is open at both top and bottom to allow water to flow therethrough. In other examples, the open channel 222 may take the form of an opening defined within the wall 216 having any size or shape that enables biocide to have increased circulation within the device 21.

The protective sleeve 200 and the electrolytic cell 202 in this example are configured to increase water circulation within the housing 52 (shown in FIG. 3) so as to increase the distribution of the byproducts (e.g., chlorine) therein during operation of the biocide-generating device. For example, one or more of the electrode plates 210 define at least one cross-flow opening 228. The cross-flow opening 228 allows water to pass through the plate 210 at a location that is between the upstream and downstream ends of the plate. In an example, the cross-flow opening 228 is a cutout in the electrode plate 210. In an aspect, the flow path of water defined by the cross-flow opening 228 incudes flow in directions that are perpendicular or at large oblique angles to the parallel electrode plates 210.

The cross-flow opening 228 is positioned on the electrode plate 210 within an upper portion 230 of the plate 210 that is defined as the portion of the plate 210 above the reference line 65 (shown in FIGS. 9 and 10) and above a lower portion 232. In other examples, the cross-flow opening 228 may extend through the reference line 65 or be disposed below the reference line 65 as required or desired. In an aspect, the cross-flow opening 228 may be an elongated slot that is orientated at an angle relative to the reference line 65. In another aspect, two or more cross-flow openings 228 may be defined within the electrode plate 210. It should be appreciated that the cross-flow opening 228 may have any shape, size, and/or orientation that enables water to flow perpendicular or at large angles to the electrode plates 210 as described herein and increase flow circulation within the housing 52. Cross-flow openings of the type described above can be provided in one, two, three, four, five, six or more of the plates 210. In certain examples, outer sets of the plates 210 are provided with cross-flow openings and an inner set of plates 210 between the outer sets of plates do not include cross-flow openings. In certain examples, the electrode plates 210 of the terminal are provided with a cross-flow opening configuration that provides more cross flow between sets of outer plates of the arrangement of parallel plates as compared to between a set of interior plates of the arrangement of parallel plates.

In the example, the cross-flow openings 228 are at least partially aligned with the open channels 222 of the protective sleeve 200. This allows water flow to exit the walls 216 of the protective sleeve 200 and circulate further within the housing 52. As such, the open channel 222 also allows water to pass through the wall 216 in a perpendicular or large angle flow path.

Additionally, or alternatively, the electrolytic cell 202 may include one or more flow diverters 234 disposed within the interstitial space defined between two of the electrode plates 210. The diverters 234 are configured to at least partially redirect water flow through the plates 210 and increase the flow control of water through the electrolytic cell 202. In an aspect, the diverters 234 may increase flow distribution evenly across the electrode plates 210. Also, circulation of water flow within the housing 52 is also increased. In an aspect, the diverters 234 also increase water flow through the cross-flow openings 228.

The diverters 234 are oriented in a direction that is substantially parallel to the longitudinal axis 53 of the housing 52. The diverter 234 spans between the upper portion 230 and the lower portion 232 of the electrode plate 210 and has shaped distal ends 235 that extend in an upstream direction. As illustrated, the distal ends are curved in the upstream direction so as to divert water containing biocide to areas within the device that may contain untreated water. Additionally or alternatively, the diverters 234 increase flow control within the interstitial space. In other examples, the distal ends may be obliquely angled or have any other type of shape that diverts water within the device 21 as described herein. The diverters 234 are downstream of the cross-flow opening 228.

In the example, the diverter 234 is supported on one or more of the fasteners 218. Additionally, the diverter 234 may also provide dielectric spacing to the plurality of electrode plates 210. As such, the diverter 234 can have the same thickness to that of the spacer 220.

Figure 21:
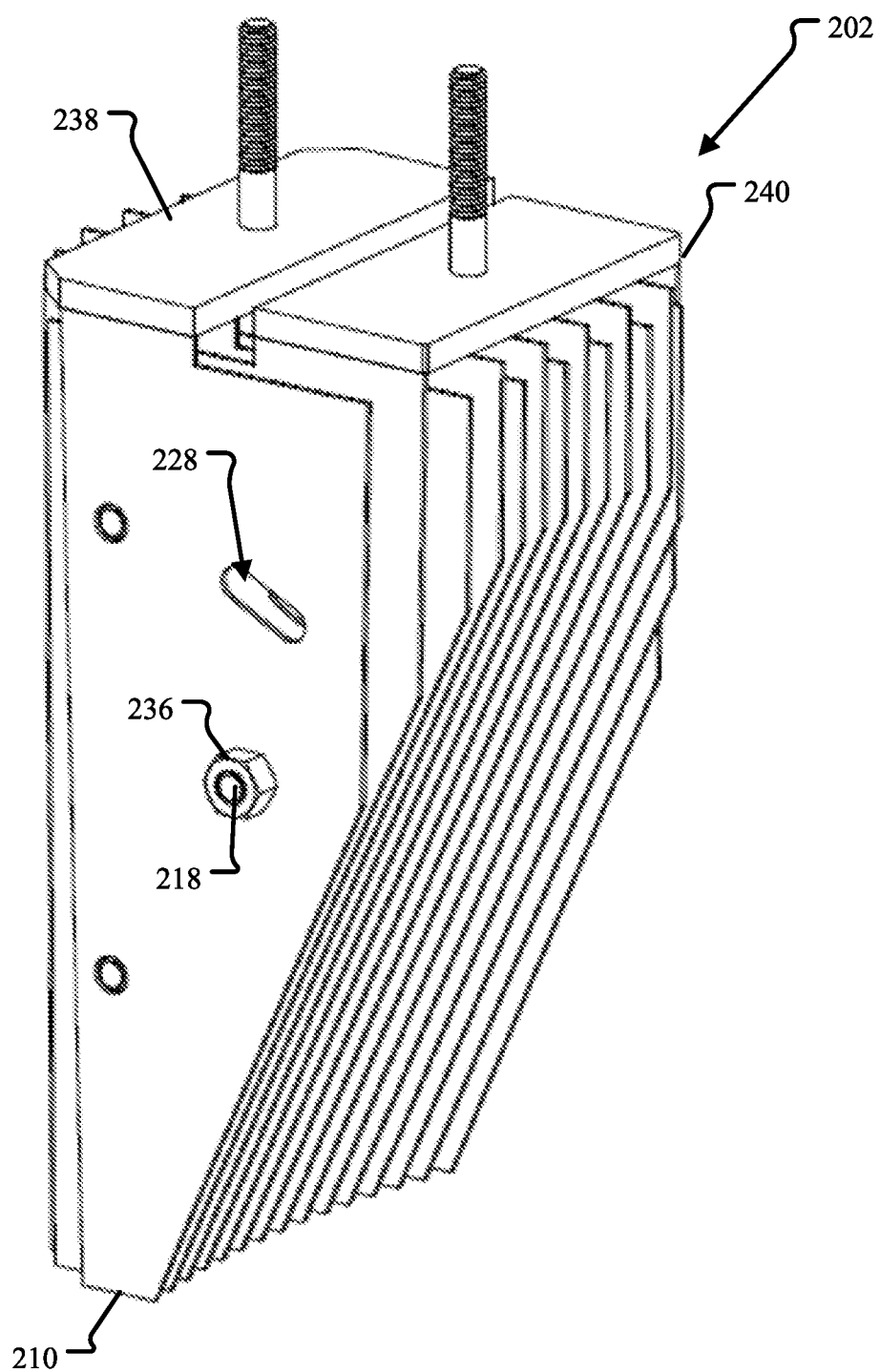
FIG. 21 is a perspective view of the electrolytic cell of FIGS. 19 and 20.

FIG. 21 is a perspective view of the electrolytic cell 202. The electrolytic cell 202 includes a plurality of the electrode plates 210 in a parallel configuration. The electrode plates 210 are secured together by one or more fasteners 218 with a nut head 236. The nut head 236 is configured to slide within the open channel 222 of the protective sleeve 200 (shown in FIGS. 19 and 20).

The electrode plates 210 alternate which terminal block 238, 240 they are coupled to. In one example, the outer two plates 210 on each side are the only plates that have the cross-flow opening 228 defined therein. In an aspect, the inside plate 210 of each pair of outer plates 210 has a smaller sized cross-flow opening 228 than the outside plate of each pair of outer plates. In this example, the sets (e.g., pairs) of outer plates of each terminal block 238, 240 are the only plates with cross-flow openings 228 and interior plates of each block positioned between the sets of outer plates do not include the cross-flow opening 228. In other examples, at least some of the interior plates may include cross-flow openings 228 as required or desired.

Figure 22:
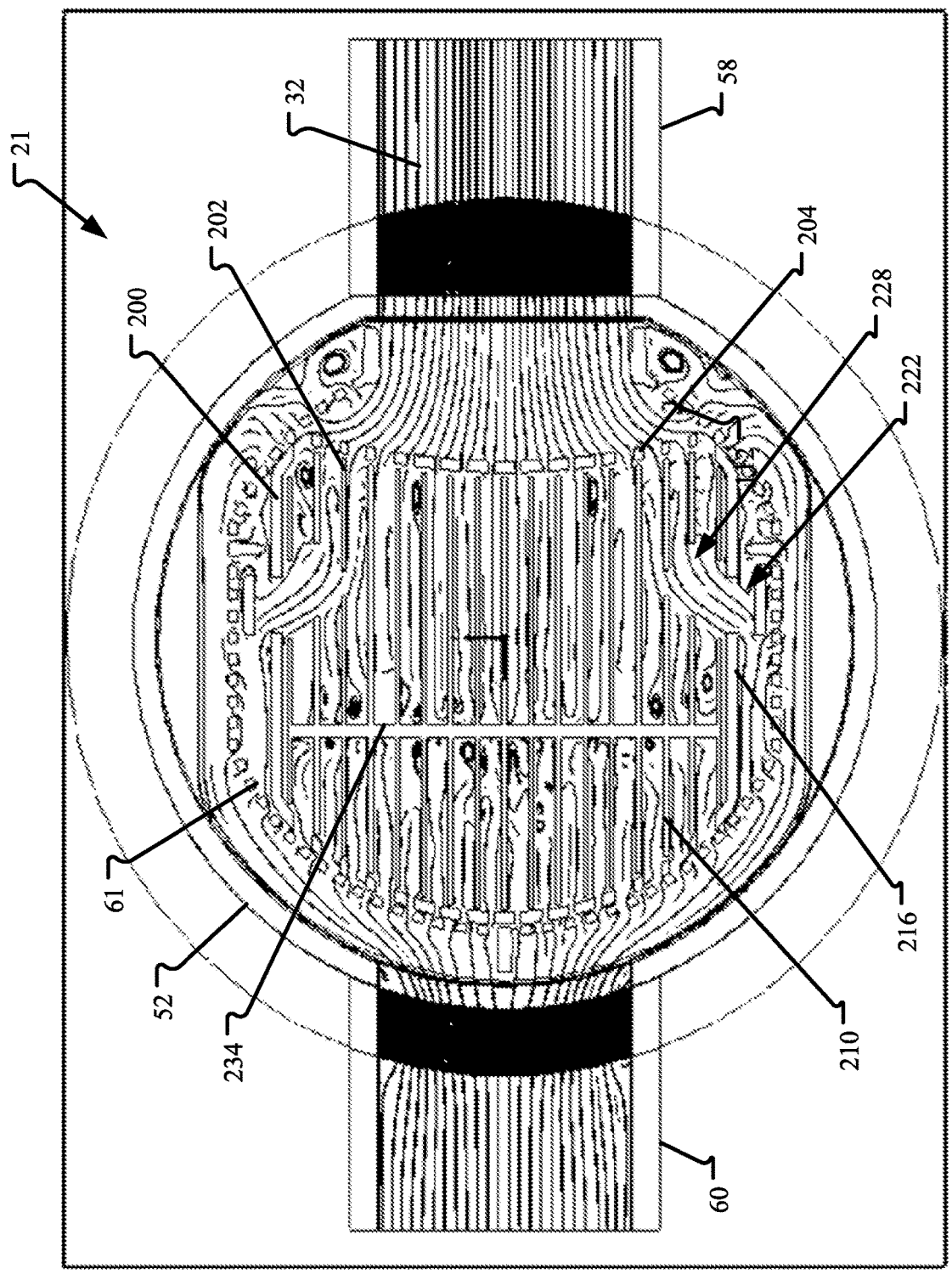
FIG. 22 is a schematic view of the biocide-generating device with the protective sleeve and electrolytic cell of FIGS. 19 and 20 illustrating water flow paths therethrough.

FIG. 22 is a schematic view of the biocide-generating device 21 with the protective sleeve 200 and the electrolytic cell 202 illustrating water flow paths therethrough. As described above, the device 21 includes the housing 52 having the water inlet 58 and the water outlet 60. The strainer 61 is disposed within the housing 52, and the protective sleeve 200 and the electrolytic cell 202 are disposed within the strainer 61.

As water flows 32 into the device 21 and through the upstream side 204 of the protective sleeve 200, the water flow path is channeled through the interstitial space between the electrode plates 210. At the side walls 216 of the protective sleeve 200, at least some of the water flows out of the open channel 222 so as to increase flow distribution and distribution of the biocide at the sides of the device. Flow through the open channel 222 can be further induced by the cross-flow openings 228 within the plates 210. As illustrated in FIG. 22, the interior plates do not have cross-flow openings 228 therein. Additionally, the diverters 234 increases the distribution of the water flow path within the interstitial space between the electrode plates 210.

Turning back to FIG. 1, the water system 22 may further include a recirculating line 23 that is routed from a first location downstream of the pump 42 to a second location at the biocide-generating device 21 or upstream of the device 21 so that a portion of the water containing biocide can be directed through the line 23 to treat the device 21 and/or conduits 38 to inhibit bio-growth. The location of the outlet of the recirculating line 23 (at either the device 21 or conduit 38) promotes mixing of the water having biocide with the water not having biocide. For example, the outlet of the recirculating line 23 is positioned far enough upstream of the device 21 to promote mixing prior to entry into the device 21. In an aspect, the second location may be proximate the inlet 28 and within the watercraft 20. In this example, the inlet 28 may include a valve and the recirculating line 23 is positioned adjacent to and downstream of the valve. In some examples, a scoop may be located at the inlet 28. In certain examples, one or more valves (not shown) can be provided within the line 23. In certain examples, similar flow lines can be included to provide biocide treatment to other components of the water system 22 as required or desired. Other aspects of the recirculating line are discussed in U.S. Pat. No. 11,027,991 and US Patent Application Publication No. 2020/0255306 both which are incorporated herein by reference in their entireties.

In the example, the recirculating line 23 may be a fraction of the diameter of the conduit 38. In an aspect, the line 23 may be less than or equal to 30% of the conduit 38 size (e.g., diameter). In yet another aspect, the line 23 may be less than or equal to 20% of the conduit 38 size (e.g., diameter). In still another aspect, the line 23 may be less than or equal to 10% of the conduit 38 size (e.g., diameter). In another aspect, the line 23 may be less than or equal to 5% of the conduit 38 size (e.g., diameter). In other examples, the recirculating line 23 has a diameter that may be between 1% and 50% of the diameter of the conduit 38. In an aspect, the line 23 has a diameter that is between 20% and 40% of the diameter of the conduit 38. In yet another aspect, the line 23 has a diameter that is about 25%, 33%, or 38% of the diameter of the conduit 38. Generally, the recirculating line 23 has a smaller diameter of the conduit 38.

In other examples, the flow through the recirculating line 23 may be a fraction of the flow through the conduit 38 (e.g., flow rate). In an aspect, the flow through the line 23 may be less than or equal to 30% of the conduit 38 flow. In yet another aspect, the flow through the line 23 may be less than or equal to 20% of the conduit 38 flow. In still another aspect, the flow through the line 23 may be less than or equal to 10% of the conduit 38 flow. In another aspect, the flow through the line 23 may be less than or equal to 5% of the conduit 38 flow. In examples, the flow through the recirculating line 23 is between 5% and 50% of the flow through the conduit 38. In an aspect, the flow through the line 23 is between 5% and 40% of the flow through the conduit 38. In another aspect, the flow through the line 23 is between 5% and 35% of the flow through the conduit 38. In yet another aspect, the flow through the line 23 is between 5% and 25% of the flow through the conduit 38. In still another aspect, the flow through the line 23 is between 10% and 50% of the flow through the conduit 38. In an aspect, the flow through the line 23 is between 10% and 40% of the flow through the conduit 38. In another aspect, the flow through the line 23 is between 10% and 35% of the flow through the conduit 38. In yet another aspect, the flow through the line 23 is between 10% and 25% of the flow through the conduit 38. Generally, the flow through the recirculating line 23 is less than the flow through the conduit 38. The recirculating line 23 is shaped and sized to provide biocide to components at or upstream of the biocide-generating device so as to reduce biofouling. However, this recirculated water need not inhibit water draw from the downstream systems and/or equipment of the watercraft.

Figure 23:
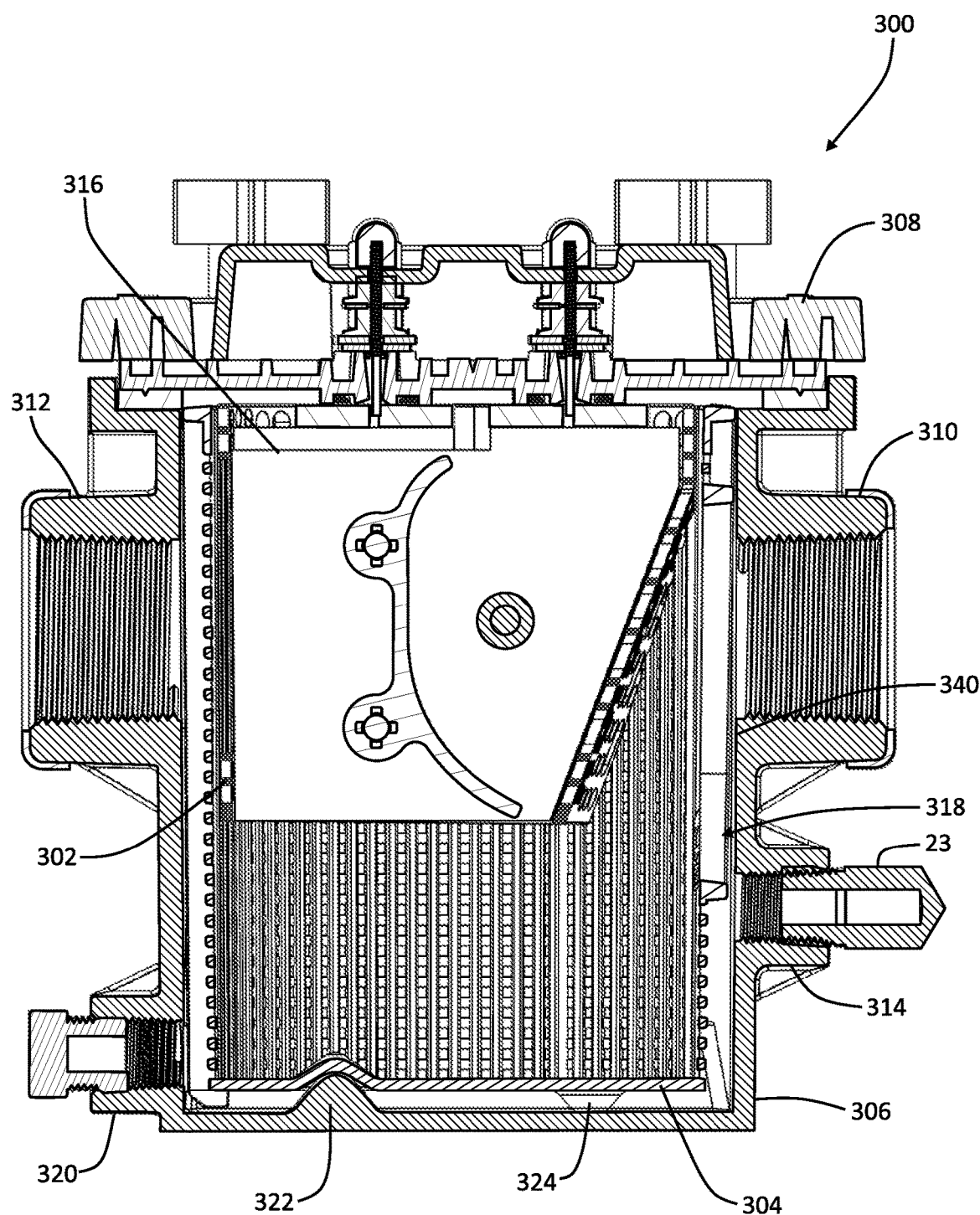
FIG. 23 is a cross-sectional view of another biocide-generating device in accordance with the principles of the present disclosure.
Figure 24:
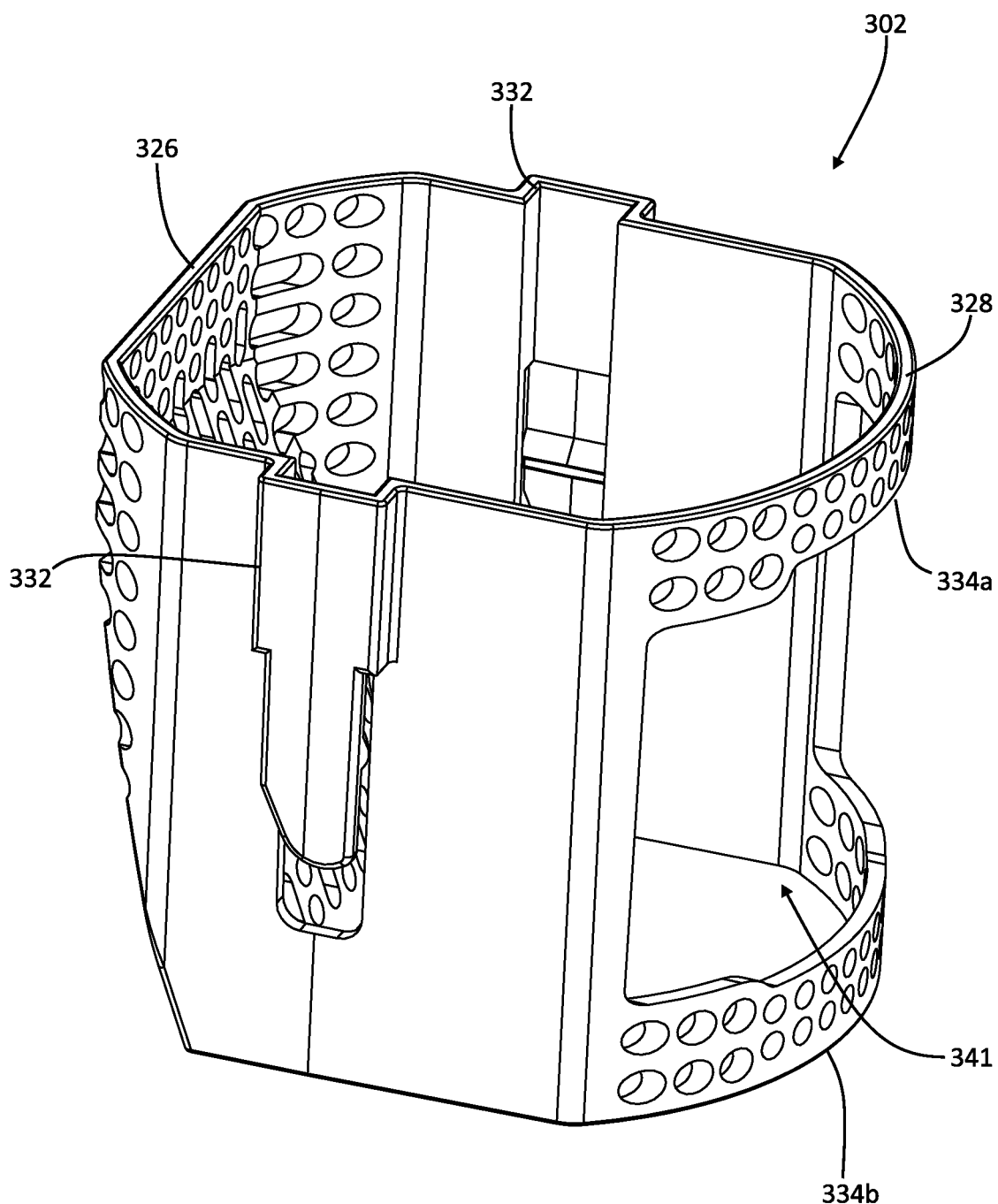
FIG. 24 is a perspective view of a protective sleeve of the biocide-generating device of FIG. 23.
Figure 25:
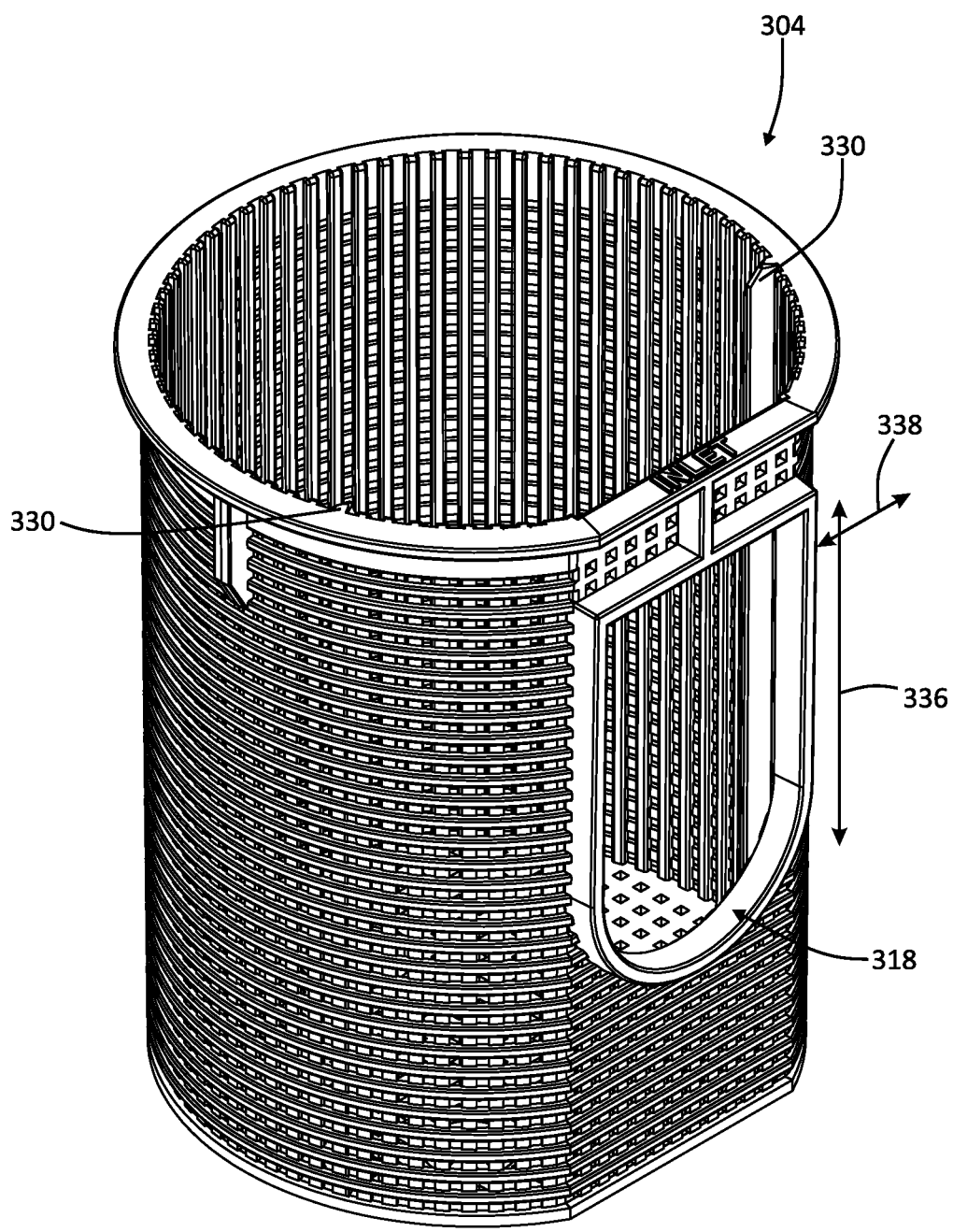
FIG. 25 is a perspective view of a strainer of the biocide generating device of FIG. 23.

FIG. 23 is a cross-sectional view of another biocide-generating device 300. FIG. 24 is a perspective view of a protective sleeve 302 and FIG. 25 is a perspective view of a strainer 304. Referring concurrently to FIGS. 23-25, the biocide-generating device 300 includes a housing 306 with a lid 308. The housing 306 includes an inlet 310 and an outlet 312, the positions of which are described above.

In this example, the housing 306 also includes a recirculating line inlet 314. As described above, in certain aspects, the recirculating line 23 (shown in FIG. 1) may enter the biocide-generating device 300 to promote mixing of biocide. By disposing the recirculating line inlet 314 at the housing 306 the pressure differential between the flow within the housing 306 and the recirculating line 23 facilitates mixing. The recirculating line inlet 314 may be positioned below the inlet 310 which facilitates ease of access to the recirculating line 23. In an aspect, the recirculating line inlet 314 may be positioned below an electrode arrangement 316. In another aspect, the recirculating line inlet 314 may be positioned at least partially below or completely below an inlet opening 318 of the strainer 304. The recirculating line inlet 314 can be substantially parallel to the inlet 310 and have the same or similar radial orientation. In other examples, the recirculating line inlet 314 may have a different radial orientation than the inlet 310. In aspects, the recirculating line inlet 314 is positioned in a lower half of the housing 306. In other aspects, the recirculating line inlet 314 is positioned in a lower third of the housing 306. The recirculating line inlet 314 may be smaller in size than the inlet 310, and for example, have a smaller diameter than the inlet 310. The housing 306 may also include a drain opening 320 as required or desired.

In examples, the biocide-generating device 300 may include the electrode arrangement 316 disposed directly within the strainer 304 and does not include the protective sleeve 302. In other examples, the biocide-generating device 300 includes the electrode arrangement 316 disposed within the protective sleeve 302 and both are disposed within the strainer 304.

The interior of the housing 306 is substantially cylindrical in shape, and as such, when the strainer 304 is being inserted into the housing 306, rotational alignment of the strainer 304 is desirable so as to align the inlet opening 318 with the inlet 310 and maintain the flow characteristics described herein. In order to ensure rotational orientation of the strainer 304 within the housing 306, the strainer 304 and the housing 306 are keyed with a key feature 322. If the key features 322 are not aligned, the strainer 304 will not allow the lid 308 properly close. With the key features 322 aligned, the strainer 304 is enabled to be oriented in only one rotational orientation within the housing 306. In the example, the key feature 322 is formed from a conical or frustoconical projection extending from the bottom of the housing 306 and a corresponding recess formed within the bottom of the strainer 304. In other examples, the strainer 304 may be formed with the projection and the housing 306 includes the recess. In other aspects, other projection/recess shapes are contemplated. While, the key feature 322 is formed at the bottom of the biocide-generating device 300, in other examples, the key feature 322 may be on the side wall or the top as required or desired. The bottom of the strainer 304 may also include one or more stands 324 for supporting the strainer 304 on the bottom of the housing 306.

In addition to the strainer 304 being oriented within the housing 306, the electrode arrangement 316 is inserted into the protective sleeve 302 with only one rotational orientation. In the example, the strainer 304 is substantially cylindrical in shape with a flat portion at the inlet opening 318 sidewall. The top outer perimeter shape of the protective sleeve 302 has the upstream side 326 formed as a flat portion which corresponds to the inlet opening 318 on the strainer and the opposite downstream side 328 formed as a curved portion. As such, the shape of the protective sleeve 302 is keyed to the shape of the strainer 304 for rotational orientation. The electrode arrangement 316 has the same or similar outer perimeter shape of the protective sleeve 302 when viewed from the top. When the protective sleeve 302 is not used, the electrode arrangement 316 can still be keyed to the strainer 304 for proper rotational orientation.

Additionally or alternatively, the strainer 304 has one or more inwardly projecting radial flanges 330. The position of the flanges 330 correspond to the position of brackets 332 of the protective sleeve 302 so as to further key the orientation of the protective sleeve 302 within the strainer 304 and to restrict or prevent rotation of the protective sleeve 302 within the strainer 304.

The upstream side 326 of the protective sleeve 302 includes larger openings than previously described. For example, the openings may be elongated in both a vertical and a horizontal orientation. In other examples, the number of openings may be greater than prior examples. The downstream side 328 of the protective sleeve 302 may be formed by top and bottom cross-members 334a, 334b. The top and bottom cross-members 334a, 334b form an opening 341 with a vertical height that is greater than the height of the top and bottom cross-members 334a, 334b combined. By increasing the flow opening at the downstream side 328 flow out of the protective sleeve 302 is increased. The opening 341 may be greater in size than any one of the openings on the upstream side 326. In examples, the opening 341 may be 10%, 20%, 30%, 40%, 50%, or more greater than the size of the openings on the upstream side 326. The opening 341 may be majority of the area of the downstream side 328. The vertical height of the opening 341 may be at least half, two-thirds, or three-quarters of a height of the protective sleeve 302.

In the example, the inlet opening 318 of the strainer 304 is non-circular in shape. A height 336 of the inlet opening 318 may be greater than a width 338. A top of the inlet opening 318 may be straight, a bottom of the inlet opening 318 may be curved, and the two sides of the inlet opening 318 may be parallel. In an aspect, the area of the inlet opening 318 is larger than the area of the inlet 310. The area of the inlet opening 318 may be 5% greater than the area of the inlet 310. The area of the inlet opening 318 may be 10%, 15%, 20%, or more than the area of the inlet 310. In an aspect, the inlet opening 318 has a shape that is different than the shape of the inlet 310. In other examples, the inlet opening 318 may have the same or a substantially similar shape as the inlet 310. While the inlet opening 318 aligns with the inlet 310, a centerline axis of the inlet opening 318 may not be coaxial with a centerline axis of the inlet 310. As such, the centerline axis of the inlet opening 318 may be offset from the centerline axis of the inlet 310. The enlarged inlet opening 318 removes portions of the strainer 304 from around an inlet edge 340 of the housing 306 that is between the interior of the housing 306 and the inlet 310. As such, flow past the inlet edge 340 during operation is increased.

As illustrated in FIG. 23, the bottom of the strainer 304 is spaced away from the bottom of the electrode arrangement 316. By creating space at the bottom of the strainer 304 the greater amount of collected debris within the water flow can be accumulated prior to removal and disposal. In an aspect, the electrode arrangement 316 is disposed in the top ⅔ of the strainer 304. In another aspect, the electrode arrangement 316 is disposed in the top half of the strainer 304. In an aspect, a bottom edge of the electrode arrangement 316 is spaced from a bottom wall of the strainer 304 by at least a quarter of a height of the strainer 304 between the bottom wall and a top end. The bottom edge of the electrode arrangement 316 may be spaced from the bottom wall by at least a third, a half, or more of the height of the strainer 304. In another aspect, a height of the electrode arrangement 316 may be less than three-quarters, two-thirds, a half, or less than a height of the strainer 304.

Figure 26:
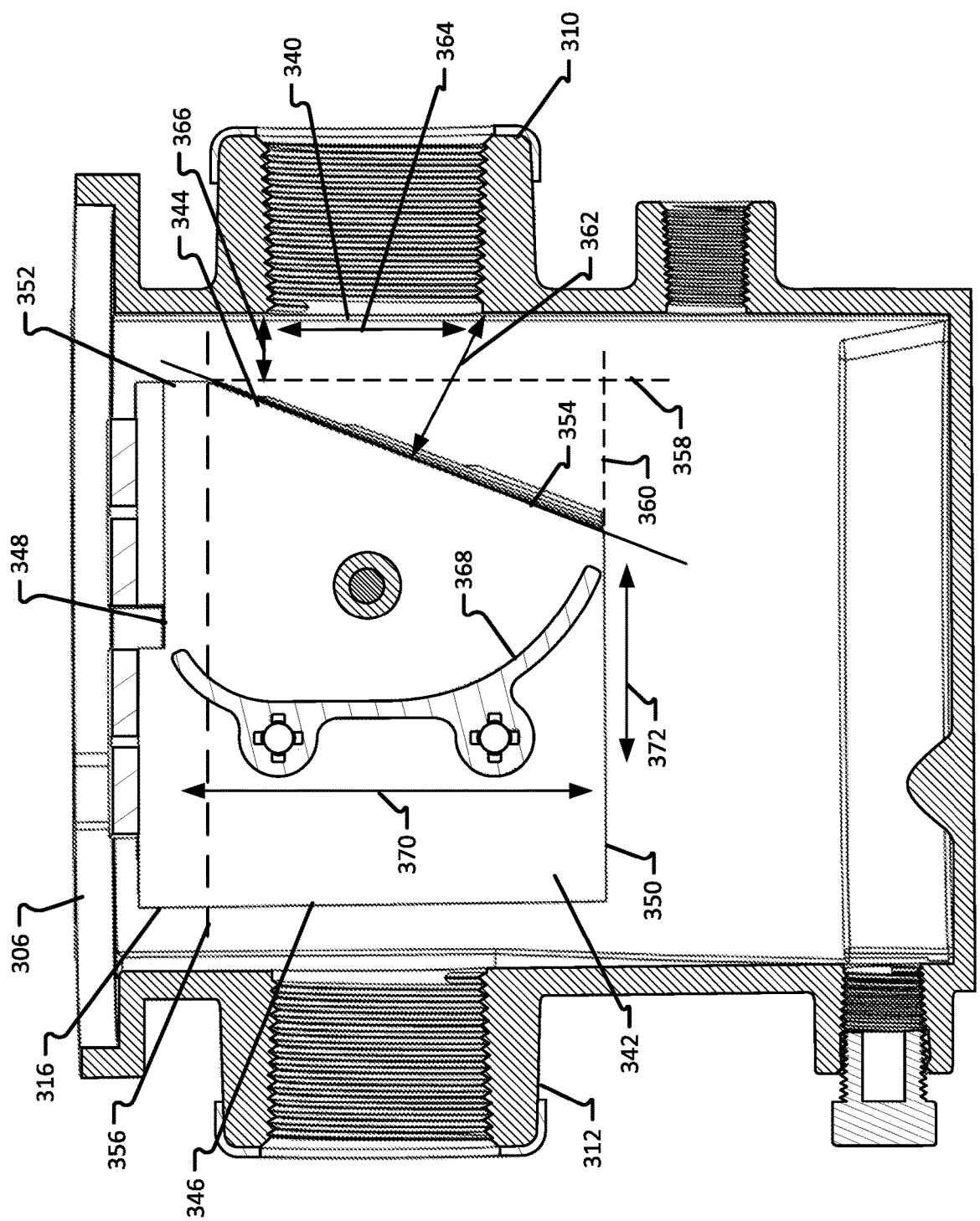
FIG. 26 is a cross-sectional view of a housing and an electrode assembly of the biocide generating device of FIG. 23.

FIG. 26 is a cross-sectional view of the housing 306 and the electrode arrangement 316 of the biocide-generating device 300 (shown in FIG. 23). The electrode arrangement 316 includes a plurality of parallel electrode plates 342 each having an upstream end 344 facing the inlet 310, a downstream end 346 facing the outlet 312, a top end 348, and a bottom end 350. As described above, the upstream end 344 has a substantially vertical portion 352 and an angled portion 354 separated by a reference line 356. In this example, the reference line 356 is positioned above the inlet 310. As such, the angled portion 354 only faces and opposes the inlet 310. In other aspect, the reference line 356 may extend through the inlet 310. A such, both a portion of the angled portion 354 and the vertical portion 352 face and oppose the inlet 310.

The angled portion 354 has a vertical component 358 and a horizontal component 360. In the example, the vertical component 358 is greater than 50% of the height of the plate 342 between the top end 348 and the bottom end 350. The vertical component 358 may be greater than 60% of the height of the plate 342 between the top end 348 and the bottom end 350. The vertical component 358 may be greater than 70% of the height of the plate 342 between the top end 348 and the bottom end 350. The vertical component 358 may be greater than 80% of the height of the plate 342 between the top end 348 and the bottom end 350. The vertical component 358 may be greater than 90% of the height of the plate 342 between the top end 348 and the bottom end 350. In the example, the horizontal component is at least 10% of the depth of the plate 342 between the upstream end 344 and the downstream end 346. The horizontal component may be at least 20% of the depth of the plate 342 between the upstream end 344 and the downstream end 346. The horizontal component may be at least 30% of the depth of the plate 342 between the upstream end 344 and the downstream end 346. The horizontal component may be at least 30% of the depth of the plate 342 between the upstream end 344 and the downstream end 346. The horizontal component may be at least 50% of the depth of the plate 342 between the upstream end 344 and the downstream end 346.

Generally, the closer the upstream ends 344 of the electrode arrangement 316 are to the inlet 310, biocide generation efficiencies are increased. However, the closer the upstream ends 344 are to the inlet 310, the more amount of accumulation and blockage of material occurs within the water flow. A first chokepoint distance 362 is defined between the inlet edge 340 and the angled portion 354 at an orthogonal angle to the angled portion 354. The inlet 310 has a cross-sectional distance 364. In an example, the inlet 310 may be circular and the cross-sectional distance 364 is a diameter. In other examples, the inlet 310 may not be circular and the cross-sectional distance 364 is the maximum dimension of the inlet shape. A ratio of the cross-sectional distance 364 relative to the chokepoint distance 362 is at least 0.5. The ratio of the cross-sectional distance 364 relative to the chokepoint distance 362 may at least 0.6. The ratio of the cross-sectional distance 364 relative to the chokepoint distance 362 may at least 0.7. In an aspect, the ratio of the cross-sectional distance 364 relative to the chokepoint distance 362 is between about 0.5 to 0.8. The ratio of the cross-sectional distance 364 relative to the chokepoint distance 362 may be between about 0.6 to 0.8. The ratio of the cross-sectional distance 364 relative to the chokepoint distance 362 may be between about 0.7 to 0.8.

The strainer inlet opening 318 (shown in FIG. 25) having the curved bottom section opens up this chokepoint distance 362 so as to reduce material accumulation at the electrode arrangement 316.

In other examples, a second chokepoint distance 366 is defined between the inlet edge 340 and the vertical portion 352. This chokepoint distance 366 is parallel to the axis of the inlet 310. A ratio of the cross-sectional distance 364 relative to the chokepoint distance 366 is at least 0.5. The ratio of the cross-sectional distance 364 relative to the chokepoint distance 366 may at least 0.6. The ratio of the cross-sectional distance 364 relative to the chokepoint distance 366 may at least 0.7. In an aspect, the ratio of the cross-sectional distance 364 relative to the chokepoint distance 366 is between about 0.5 to 0.8. The ratio of the cross-sectional distance 364 relative to the chokepoint distance 366 may be between about 0.6 to 0.8. The ratio of the cross-sectional distance 364 relative to the chokepoint distance 362 may be between about 0.7 to 0.8.

While the chokepoint distances 362, 366 are described as being between the housing 306 and the electrode arrangement 316, the chokepoint distances 362, 366 are essentially the distance between two blocking components that define a flow channel for the water. In examples, this is the electrode arrangement 316 as described above. In other examples, the electrode arrangement 316 may be disposed within the protective sleeve 302 (shown in FIG. 24). As such, the chokepoint distances 362, 366 may alternatively be defined between the housing 306 and the upstream side of the protective sleeve 302 that faces the inlet 310. In still other aspects, when the strainer 304 (shown in FIG. 25) has its inlet opening that is closer to the inlet 310, the chokepoint distances 362, 366 may alternatively be defined between edges/surfaces of the strainer 304 and the electrode arrangement 316 or the protective sleeve 302.

The electrode arrangement 316 also includes one or more flow diverters 368 disposed within the interstitial space between two plates 342. The flow diverter 368 are elongated in a vertical direction with a height 370. In an example, the height 370 is greater than a quarter, a third, a half, or more of the height of the plate 342 between the top end 348 and the bottom end 350. The height 370 may be greater than ⅔ of the height of the plate 342 between the top end 348 and the bottom end 350. The height 370 may be greater than ¾ of the height of the plate 342 between the top end 348 and the bottom end 350. In another example, the flow diverter 368 is disposed within a middle half of the plate 342 between the upstream and downstream ends 344, 346. The flow diverter 368 may be disposed within a middle third of the plate 342 between the upstream and downstream ends 344, 346. The flow diverter 368 may be disposed within a middle quarter of the plate 342 between the upstream and downstream ends 344, 346.

Each end of the flow diverter 368 is directed toward the upstream end 344 and toward the inlet 310. In the example, each end of the flow diverter 368 is curved. In an aspect, one end of the flow diverter 368 is different than the other end. For example, as illustrated in FIG. 26, the bottom end has a larger radius of curvature and extends further towards the upstream end 344 of the plate 342 than the top end.

In the example, the flow diverter 368 may be fully opposite the cross-sectional distance 364 of the inlet 310. In other examples, the flow diverter 368 may only be opposing 90%, 80%, 70%, 60%, 50% or less of the cross-sectional distance 364 of the inlet 310. In an aspect, the flow diverter 368 has a width 372 that is less than 50% of the depth of the plate 342 between the upstream and downstream ends 344, 346. In other aspects, the width 372 may be less than 40%, 30%, 20% or less of the depth of the plate 342 between the upstream and downstream ends 344, 346.

Examples

Illustrative examples of the systems and methods described herein are provided below. An embodiment of the system or method described herein may include any one or more, and any combination of, the aspects described below.

Aspect 1. A biocide-generating device including: a housing having an inlet and an outlet; a strainer basket that mounts within an interior of the housing; parallel electrode plates positioned within an interior of the strainer basket; and a protective dielectric sleeve in which the electrode plates are received, the protective dielectric sleeve being positioned between the electrode plates and the strainer basket, the protective sleeve defining holes larger than straining holes defined by the strainer basket.

Aspect 2. The biocide-generating device of any one of aspects 1-16, wherein the strainer basket is removable from the housing through an upper end of the housing.

Aspect 3. The biocide-generating device of any one of aspects 1-16, wherein the strainer basket has an open upper end and a closed lower end.

Aspect 4. The biocide-generating device of any one of aspects 1-16, wherein the strainer basket has an inlet opening that aligns with the inlet of the housing such that water enters the strainer basket through the inlet opening and passes outwardly through strainer openings of the strainer basket before exiting the housing through the outlet.

Aspect 5. The biocide-generating device of any one of aspects 1-16, wherein the openings in the sleeve are smaller than a spacing between the electrode plates.

Aspect 6. The biocide-generating device of any one of aspects 1-16, wherein the sleeve includes an upstream side that faces the inlet and a downstream side that faces the outlet.

Aspect 7. The biocide-generating device of any one of aspects 1-16, wherein the upstream side has a concave outer shape and a convex inner shape, and the downstream side has a convex shape outer shape and a concave inner shape.

Aspect 8. The biocide-generating device of any one of aspects 1-16, wherein the parallel electrode plates have an upstream side that is concave and fits within the convex inner shape of the upstream side of the sleeve and a downstream side that is convex in shape and fits within the concave inner shape of the downstream side of the sleeve.

Aspect 9. The biocide-generating device of any one of aspects 1-16, wherein openings in the sleeve are only provided at the upstream and downstream sides of the sleeve.

Aspect 10. The biocide-generating device of any one of aspects 1-16, wherein the openings in the sleeve have a larger average size adjacent mid-regions of the upstream and downstream sides of the sleeve as compared to side regions of the upstream and downstream sides of the sleeve, the mid-regions of each of the upstream and downstream sides being positioned between corresponding ones of the side regions of the upstream/downstream sides, the mid-regions and side regions having lengths extending in upward/downward directions.

Aspect 11. The biocide-generating device of any one of aspects 1-16, wherein the parallel electrode plates are angled along a reference plane that is at an oblique angle relative to an axis that extends from the inlet towards the outlet.

Aspect 12. The biocide-generating device of any one of aspects 1-16, wherein there is space below the reference plane where debris collects as water flows from the inlet to the outlet.

Aspect 13. The biocide-generating device of any one of aspects 1-16, wherein the sleeve is angled along the reference plane.

Aspect 14. The biocide-generating device of any one of aspects 1-16, wherein the strainer basket includes an opening that corresponds to the inlet for allowing water from the inlet to enter the strainer basket before being strained.

Aspect 15. The biocide-generating device of any one of aspects 1-16, wherein at least one of the parallel electrode plates define at least one cross-flow opening that forms a flow path for water through the respective parallel electrode plate.

Aspect 16. The biocide-generating device of any one of aspects 1-16, further including one or more diverters disposed between two of the parallel electrode plates, at least a portion of the one or more diverters curving in an upstream direction.

Aspect 17. A biocide-generating device including: a housing having an inlet and an outlet; a strainer basket that mounts within an interior of the housing; a plurality of parallel electrode plates positioned within an interior of the strainer basket, at least one of the plurality of parallel electrode plates define at least one cross-flow opening, the at least one cross-flow opening allowing water to pass through the respective parallel electrode plate; and a protective dielectric sleeve in which the plurality of parallel electrode plates are received, the protective dielectric sleeve being positioned between the plurality of parallel electrode plates and the strainer basket.

Aspect 18. The biocide-generating device of any one of aspects 17-25, wherein each of the plurality of parallel electrode plates have an upper portion defined above a reference line, the at least one cross-flow opening positioned within the upper portion.

Aspect 19. The biocide-generating device of any one of aspects 17-25, wherein the inlet and the outlet are co-axial along an axis, the reference line being parallel to the axis, and the at least one cross-flow opening being elongated and orientated at an angle relative to the reference line.

Aspect 20. The biocide-generating device of any one of aspects 17-25, wherein at least some interior electrode plates of the plurality of parallel electrode plates do not include the at least one cross-flow opening.

Aspect 21. The biocide-generating device of any one of aspects 17-25, wherein the protective dielectric sleeve has a pair of walls parallel to the plurality of parallel electrode plates, each of the pair of walls defining an open channel allowing water to pass through the wall.

Aspect 22. The biocide-generating device of any one of aspects 17-25, wherein the open channel is substantially aligned with the at least one cross-flow opening.

Aspect 23. The biocide-generating device of any one of aspects 17-25, wherein the protective dielectric sleeve includes a latch disposed proximate the open channel and configured to releasably secure the plurality of parallel electrode plates within the protective dielectric sleeve.

Aspect 24. The biocide-generating device of any one of aspects 17-25, further including one or more diverters disposed between two of the plurality of parallel electrode plates, at least a portion of the one or more diverters shaped in an upstream direction.

Aspect 25. The biocide-generating device of any one of aspects 17-25, wherein the one or more diverters are downstream of the at least one cross-flow opening.

Aspect 26. A biocide-generating device including: a housing having an inlet and an outlet; a strainer basket that mounts within an interior of the housing; a plurality of parallel electrode plates positioned within an interior of the strainer basket; one or more diverters disposed within an interstitial space defined between each of the plurality of parallel electrode plates, at least a portion of the one or more diverters shaped towards an upstream direction; and a protective dielectric sleeve in which the plurality of parallel electrode plates are received, the protective dielectric sleeve being positioned between the plurality of parallel electrode plates and the strainer basket.

Aspect 27. The biocide-generating device of any one of aspects 26-31, wherein the one or more diverters span between an upper portion of the parallel electrode plate and a lower portion of the parallel electrode plate.

Aspect 28. The biocide-generating device of any one of aspects 26-31, wherein the shape of the one or more diverters include a curved portion occurring at a distal end.

Aspect 29. The biocide-generating device of any one of aspects 26-31, wherein the housing has a first end and a second end defining a longitudinal axis, the one or more diverters being substantially parallel to the longitudinal axis.

Aspect 30. The biocide-generating device of any one of aspects 26-31, wherein the one or more diverters are supported by one or more fasteners that couple the plurality of parallel electrode plates together, the diverters also providing dielectric spacing to the plurality of parallel electrode plates.

Aspect 31. The biocide-generating device of any one of aspects 26-31, wherein at least one of the plurality of parallel electrode plates define at least one cross-flow opening that defines a flow path for water through the respective parallel electrode plate, the at least one cross-flow opening upstream of the one or more diverters.

Aspect 32. A biocide-generating device including: a housing having an inlet and an outlet; and a plurality of parallel electrode plates positioned within an interior of the housing, at least one of the plurality of parallel electrode plates define at least one cross-flow opening, the at least one cross-flow opening allowing water to pass through the respective parallel electrode plate.

Aspect 33. The biocide-generating device of any one of aspects 32-38, wherein the plurality of parallel electrode plates include a first set of electrode plates coupled to a first terminal block and a second set of electrode plates coupled to a second terminal block, wherein outside plates of both the first and second sets of electrode plates include the at least one cross-flow opening.

Aspect 34. The biocide-generating device of any one of aspects 32-38, wherein inside plates of the both the first and second sets of electrode plates do not include the at least one cross-flow opening.

Aspect 35. The biocide-generating device of any one of aspects 32-38, wherein the first set of electrode plates alternate with the second set of electrode plates.

Aspect 36. The biocide-generating device of any one of aspects 32-38, wherein an outermost pair of the plurality of parallel electrode pates include the at least one cross-flow opening and a second pair of parallel electrode plates immediately inside the outermost pair include the at least one cross-flow opening.

Aspect 37. The biocide-generating device of any one of aspects 32-38, wherein the at least one cross-flow opening in the outermost pair of the plurality of parallel electrode pates are larger than the at least one cross-flow opening in the second pair of parallel electrode plates.

Aspect 38. The biocide-generating device of any one of aspects 32-38, further including one or more diverters disposed between two of the plurality of parallel electrode plates, at least a portion of the one or more diverters extending in an upstream direction.

Aspect 39. A biocide-generating device including: a housing having an inlet and an outlet; a plurality of parallel electrode plates positioned within an interior of the housing; and one or more diverters disposed within an interstitial space defined between each of the plurality of parallel electrode plates, at least a portion of the one or more diverters shaped towards an upstream direction.

Aspect 40. The biocide-generating device of any one of aspects 39-45, wherein the one or more diverters are curved towards the upstream direction. Aspect 41. The biocide-generating device of any one of aspects 39-45, wherein each distal end of the one or more diverters are curved.

Aspect 42. The biocide-generating device of any one of aspects 39-45, wherein the one or more diverters are transversely aligned with respect to the plurality of parallel electrode plates.

Aspect 43. The biocide-generating device of any one of aspects 39-45, wherein the one or more diverters defines a thickness of the interstitial space.

Aspect 44. The biocide-generating device of any one of aspects 39-45, wherein at least one of the plurality of parallel electrode plates define at least one cross-flow opening that defines a flow path for water through the respective parallel electrode plate.

Aspect 45. The biocide-generating device of any one of aspects 39-45, wherein the one or more diverters is disposed between two electrode plates that do not have the at least one cross-flow opening.

Aspect 46. An on-board water system for a watercraft, the water system including: an inlet conduit configured for drawing untreated water from a body of water; a biocide-generating device in flow communication with the inlet conduit, the biocide-generating device including: a housing; a strainer basket that mounts within an interior of the housing; and a plurality of parallel electrode plates positioned within an interior of the strainer basket, wherein at least a portion of the untreated water from the inlet conduit is configured to pass through the plurality of parallel electrode plates so as to generate biocide; a pump downstream of the biocide-generating device; and a recirculation line having an inlet positioned downstream of the pump and an outlet at or upstream of the biocide-generating device, wherein a portion of the water having biocide is channeled to components at or upstream of the biocide-generating device, and wherein flow through the recirculating line is between 5% and 50% of flow through the inlet conduit.

Aspect 47. The on-board water system of any one of aspects 46-50, wherein the flow through the recirculating line is between 10% and 25% of the flow through the inlet conduit.

Aspect 48. The on-board water system of any one of aspects 46-50, wherein the outlet of the recirculation line is disposed at the housing of the biocide-generating device.

Aspect 49. The on-board water system of any one of aspects 46-50, wherein the outlet of the recirculation line is disposed at the inlet conduit.

Aspect 50. The on-board water system of any one of aspects 46-50, wherein the outlet is spaced upstream from the biocide-generating device so as to promote mixing of the water having biocide with the untreated water within the inlet conduit.

Aspect 51. A biocide-generating device including: a housing having an inlet and an outlet; a strainer basket that mounts within an interior of the housing, the strainer basket defining an opening; and a plurality of parallel electrode plates positioned within an interior of the strainer basket; wherein the opening of the strainer basket aligns with the inlet of the housing, the opening of the strainer basket having an area that is greater than the inlet of the housing.

Aspect 52. The biocide-generating device of any one of aspects 51-54, wherein the opening of the strainer basket has an area that 5%, 10%, 15%, or 20% greater than the inlet of the housing.

Aspect 53. The biocide-generating device of any one of aspects 51-54, wherein a centerline axis of the opening of the strainer basket is offset from a centerline axis of the inlet of the housing.

Aspect 54. The biocide-generating device of any one of aspects 51-54, wherein the opening of the strainer basket has a different shape than the inlet of the housing.

Aspect 55. A biocide-generating device including: a housing having an inlet and an outlet; a strainer basket that mounts within an interior of the housing, wherein the strainer basket only mounts within the interior of the housing in one rotational orientation; and a plurality of parallel electrode plates positioned within an interior of the strainer basket.

Aspect 56. The biocide-generating device of any one of aspects 55-61, wherein the plurality of parallel electrode plates mount only in one rotational orientation within the interior of the strainer basket.

Aspect 57. The biocide-generating device of any one of aspects 55-61, further including a protective sleeve for the plurality of parallel electrode plates, the protective sleeve configured to mount within the interior of the strainer basket in only one rotational orientation.

Aspect 58. The biocide-generating device of any one of aspects 55-61, wherein the housing includes a projection and the strainer basket includes a corresponding recess that at least partially define the one rotational orientation.

Aspect 59. The biocide-generating device of any one of aspects 55-61, wherein the protective sleeve includes a bracket and the basket includes one or more interior struts that at least partially define the one rotational orientation.

Aspect 60. The biocide-generating device of any one of aspects 55-61, wherein a top outer perimeter of the plurality of parallel electrode plates corresponds to a top outer perimeter of the protective sleeve.

Aspect 61. The biocide-generating device of any one of aspects 55-61, wherein a top outer perimeter of the protective sleeve corresponds to a top outer perimeter of the strainer basket.

Aspect 62. A biocide-generating device including a housing having an inlet and an outlet; a strainer basket that mounts within an interior of the housing; and a plurality of parallel electrode plates positioned within an interior of the strainer basket, each plate of the plurality of parallel electrode plates including an upstream edge and a downstream edge, the upstream edge having an oblique angled portion that at least partially faces the inlet of the housing.

Aspect 63. The biocide-generating device of any one of aspects 62-66, wherein only the oblique angled portion is downstream of the inlet of the housing.

Aspect 64. The biocide-generating device of any one of aspects 62-66, wherein the oblique angled portion has an angle of at least 45° relative to horizontal.

Aspect 65. The biocide-generating device of any one of aspects 62-66, wherein the oblique angled portion has a vertical component and a horizontal component, the vertical component greater than 50% of a height of the plate and the horizontal component at least 10% of a depth of the plate between the upstream and downstream ends.

Aspect 66. The biocide-generating device of any one of aspects 62-66, further comprising a protective sleeve at least partially housing the plurality of parallel electrode plates, the protective sleeve having an upstream side with an oblique portion corresponding to the oblique angled portion of the plates.

Aspect 67. A biocide-generating device including a housing having an inlet and an outlet; a strainer basket that mounts within an interior of the housing and having a bottom wall; and a plurality of parallel electrode plates positioned within an interior of the strainer basket, each plate of the plurality of parallel electrode plates including a top edge and a bottom edge, the bottom edge spaced from the bottom wall at least a quarter of a height of the strainer basket.

Aspect 68. The biocide-generating device of any one of aspects 67-69, wherein a height of the plate between the top edge and the bottom edge is not more than two-thirds of the height of the strainer basket.

Aspect 69. The biocide-generating device of any one of aspects 67-69, wherein the plurality of parallel electrode plates are disposed in a top half of the strainer basket.

Aspect 70. A biocide-generating device including a housing having an inlet and an outlet; a strainer basket that mounts within an interior of the housing; a protective sleeve; and a plurality of parallel electrode plates positioned within the protective sleeve and disposed within the interior of the housing, wherein the protective sleeve includes an upstream side facing the inlet and a downstream side facing the outlet, the downstream side having at least one opening greater in size than openings defined within the upstream side.

Aspect 71. The biocide-generating device of any one of aspects 70-75, wherein the at least one opening in the downstream side is formed by top and bottom cross-members, the top and bottom cross-members having openings.

Aspect 72. The biocide-generating device of any one of aspects 70-75, wherein the at least one opening of the downstream side is at least 10%, 20%, or 30% greater than a size of the openings of the upstream side.

Aspect 73. The biocide-generating device of any one of aspects 70-75, wherein the at least one opening of the downstream side has a vertical height that is greater than a height of the top and bottom cross-members.

Aspect 74. The biocide-generating device of any one of aspects 70-75, wherein the at least one opening of the downstream side has a vertical height that is greater than half of a height of the protective sleeve.

Aspect 75. The biocide-generating device of any one of aspects 70-75, wherein the at least one opening of the downstream side is a majority of the downstream side of the protective sleeve.

Aspect 76. A biocide-generating device including: a housing having an inlet and an outlet, the housing defining an interior; a strainer basket that removably mounts within the interior of the housing, the basket defining an inlet opening configured to align with the inlet of the housing; a plurality of parallel electrode plates positioned at least partially within the strainer basket, each of the plurality of parallel electrode plates separated from one another by an interstitial space; and one or more flow diverters disposed within the interstitial space between two plates of the plurality of parallel electrode plates.

Aspect 77. A biocide-generating device including: a housing having an inlet and an outlet, the housing defining an interior; a strainer basket that removably mounts within the interior of the housing, the basket defining an inlet opening configured to align with the inlet of the housing; a plurality of parallel electrode plates positioned at least partially within the strainer basket, each of the plurality of parallel electrode plates separated from one another by an interstitial space, each of the plurality of parallel electrode plates having an upstream area facing the inlet, a downstream area facing the outlet, a first area, and a second area; and one or more flow diverters disposed within the interstitial space between two plates of the plurality of parallel electrode plates, the one or more flow diverters positioned between the upstream and downstream areas and substantially elongated in a direction between the first area and the second area, wherein the one or more flow diverters have a length that is more than a quarter of a length of the plurality of parallel electrode plates between the first and second areas.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. A biocide-generating device comprising:
a housing having an inlet and an outlet, the housing defining an interior;
a strainer basket that removably mounts within the interior of the housing, the strainer basket defining an inlet opening;
a plurality of electrode plates positioned at least partially within the strainer basket, each of the plurality of electrode plates separated from one another by an interstitial space, each of the plurality of electrode plates having an upstream end facing the inlet, a downstream end facing the outlet, a first end, and a second end, wherein the first end and the second end extend in a direction that is orthogonal relative to a direction that the upstream end and the downstream end extend, wherein the plurality of electrode plates include a first set of electrode plates coupled to a first terminal block and a second set of electrode plates coupled to a second terminal block, the first set of electrode plates and the second set of electrode plates having outside plates and inside plates within the sets, and wherein the outside plates of both the first and second sets of electrode plates define at least one cross-flow opening allowing flow to pass through the respective electrode plate, and wherein one or more of the inside plates of both the first and second sets of electrode plates do not include at least one cross-flow opening; and
one or more flow diverters disposed within the interstitial space between two of the plurality of electrode plates, the one or more flow diverters positioned between the upstream and downstream ends and substantially elongated in the direction between the first end and the second end, wherein the one or more flow diverters have a length that is more than a quarter of a length of the plurality of electrode plates between the first and second ends.

2. The biocide-generating device of claim 1, wherein at least a portion of the one or more flow diverters are curved or obliquely angled in the direction towards the upstream end of the two of the plurality of electrode plates.

3. The biocide-generating device of claim 1, wherein a shape of the one or more flow diverters include a curved portion at an end of the one or more flow diverters.

4. The biocide-generating device of claim 3, wherein each of the one or more flow diverters have a first curved end and a second curved end, wherein the shape of the first curved end is different from the second curved end.

5. The biocide-generating device of claim 1, wherein one or both of the housing and the strainer basket includes a key feature for defining orientation of the strainer basket within the interior of the housing.

6. The biocide-generating device of claim 1, wherein a ratio of a cross-sectional distance of the inlet relative to a chokepoint distance defined between the inlet and the upstream end of each of the plurality of electrode plates is at least 0.5.

7. The biocide-generating device of claim 1, further comprising a protective sleeve in which the plurality of electrode plates are received, the protective sleeve being positioned between the plurality of electrode plates and the strainer basket.

8. A biocide-generating device comprising:
a housing having an inlet and an outlet, the housing defining an interior;
a strainer basket that removably mounts within the interior of the housing, the basket defining an inlet opening configured to align with the inlet of the housing; and
a plurality of electrode plates positioned at least partially within the strainer basket, at least one of the plurality of electrode plates defining at least one cross-flow opening, the at least one cross-flow opening allowing flow to pass through the respective electrode plate, wherein the plurality of electrode plates include a first set of electrode plates coupled to a first terminal block and a second set of electrode plates coupled to a second terminal block, the first set of electre electrode plates and the second set of electrode plates having outside plates and inside plates within the sets, and wherein the outside plates of both the first and second sets of electrode plates include the at least one cross-flow opening, and wherein one or more of the inside plates of both the first and second sets of electrode plates do not include the at least one cross-flow opening.

9. The biocide-generating device of claim 8, wherein each of the plurality of electrode plates have an upper portion defined above a reference line, the at least one cross-flow opening positioned within the upper portion.

10. The biocide-generating device claim 8, wherein one or both of the housing and the strainer basket includes a key feature for defining rotational orientation of the strainer basket within the interior of the housing.

11. The biocide-generating device of claim 8, further comprising one or more flow diverters disposed within an interstitial space defined between each of the plurality of electrode plates, or wherein a ratio of a cross-sectional distance of the inlet relative to a chokepoint distance defined between the inlet and an upstream end of each of the plurality of electrode plates is at least 0.5.

12. The biocide-generating device of claim 8, further comprising a protective sleeve in which the plurality of electrode plates are received, the protective sleeve being positioned between the plurality of electrode plates and the strainer basket.

13. A biocide-generating device comprising:
a housing having an inlet and an outlet, the housing defining an interior, the inlet having a cross-sectional distance and an inlet edge at least partially defining a boundary of the inlet with the interior of the housing;
a strainer basket that removably mounts within the interior of the housing, the basket defining an inlet opening; and
a plurality of electrode plates positioned at least partially within the strainer basket, each of the plurality of electrode plates having an upstream end facing the inlet, at least a portion of the upstream end of each of the plurality of electrode plates is angled along a reference plane that is at an oblique angle relative to an axis defined by the inlet, wherein a ratio of the cross-sectional distance of the inlet relative to a chokepoint distance defined between the inlet edge and the upstream end of each of the plurality of electrode plates is between about 0.5 to 0.8.

14. The biocide-generating device of claim 13, wherein the chokepoint distance is defined between the inlet edge and the angled portion of the upstream end of each of the plurality of electrode plates such that the chokepoint distance is orthogonal relative to the upstream end of each of the plurality of electrode plates.

15. The biocide-generating device of claim 13, wherein the ratio of the cross-sectional distance relative to the chokepoint distance is between 0.7 and 0.8.

16. The biocide-generating device of claim 13, wherein the inlet is circular and the cross-sectional distance is a diameter of the inlet.

17. The biocide-generating device of claim 13, further comprising one or more flow diverters disposed within an interstitial space defined between each of the plurality of electrode plates, or wherein at least one of the plurality of electrode plates define at least one cross-flow opening that defines a flow path through the respective electrode plate.

18. The biocide-generating device of claim 13, further comprising a protective sleeve in which the plurality of electrode plates are received, the protective sleeve being positioned at least partially between the upstream end of the plurality of electrode plates and the inlet edge such that a second chokepoint distance is defined between the inlet edge and a surface of the protective sleeve, wherein a ratio of the cross-sectional distance of the inlet relative to the second chokepoint distance is at least 0.5.

19. A biocide-generating device comprising:
a housing having an inlet and an outlet, the housing defining an interior;
a strainer basket that removably mounts within the interior of the housing, the strainer basket defining an inlet opening;
a plurality of electrode plates positioned at least partially within the strainer basket, each of the plurality of electrode plates separated from one another by an interstitial space, each of the plurality of electrode plates having an upstream end facing the inlet, a downstream end facing the outlet, a first end, and a second end; and
one or more flow diverters disposed within the interstitial space between two of the plurality of electrode plates, the one or more flow diverters positioned between the upstream and downstream ends and substantially elongated in a direction between the first end and the second end, wherein the one or more flow diverters have a length that is more than a quarter of a length of the plurality of electrode plates between the first and second ends, wherein a shape of the one or more flow diverters includes a curved portion at both ends of the one or more flow diverters, each of the one or more flow diverters having a first curved end and a second curved end, and wherein the shape of the first curved end is different from the second curved end.

20. A biocide-generating device comprising:
a housing having an inlet and an outlet, the housing defining an interior, the inlet having a cross-sectional distance and an inlet edge at least partially defining a boundary of the inlet with the interior of the housing;
a strainer basket that removably mounts within the interior of the housing, the basket defining an inlet opening; and
a plurality of electrode plates positioned at least partially within the strainer basket, each of the plurality of electrode plates having an upstream end facing the inlet, at least a portion of the upstream end of each of the plurality of electrode plates is angled along a reference plane that is at an oblique angle relative to an axis defined by the inlet, wherein a ratio of the cross-sectional distance of the inlet relative to a chokepoint distance defined between the inlet edge and the upstream end of each of the plurality of electrode plates is at least 0.5, and wherein the chokepoint distance is defined between the inlet edge and the angled portion of the upstream end of each of the plurality of electrode plates such that the chokepoint distance is orthogonal relative to the upstream end of each of the plurality of electrode plates.

* * * * *